(12) United States Patent
Lacaze et al.

(10) Patent No.: US 12,123,955 B2
(45) Date of Patent: Oct. 22, 2024

(54) SYSTEMS AND METHODS FOR SELECTIVE GLOBAL NAVIGATION SATELLITE SYSTEM (GNSS) NAVIGATION

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US); Joseph Putney, Waterford, VA (US); Ray Wilhelm, Gaithersburg, MD (US); Tanner Ray, Germantown, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 185 days.

(21) Appl. No.: 17/839,332

(22) Filed: Jun. 13, 2022

(65) Prior Publication Data

US 2022/0397680 A1    Dec. 15, 2022

Related U.S. Application Data

(60) Provisional application No. 63/209,657, filed on Jun. 11, 2021.

(51) Int. Cl.
*G01S 19/14* (2010.01)
*H01Q 3/08* (2006.01)

(52) U.S. Cl.
CPC ............... *G01S 19/14* (2013.01); *H01Q 3/08* (2013.01)

(58) Field of Classification Search
CPC ................... G01S 19/14; H01Q 3/08
USPC .................................... 342/357.52
See application file for complete search history.

(56) References Cited

U.S. PATENT DOCUMENTS

| | | | |
|---|---|---|---|
| 5,452,211 A | 9/1995 | Kyrtsos | |
| 5,663,734 A | 9/1997 | Krasner | |
| 6,064,942 A | 5/2000 | Johnson | |
| 6,363,123 B1 | 3/2002 | Balodis | |
| 8,188,912 B1 | 5/2012 | Weisenburger | |
| 2008/0068263 A1* | 3/2008 | Tekawy | G01S 19/53 342/357.36 |
| 2009/0140916 A1 | 6/2009 | Shamoto | |
| 2009/0254278 A1 | 10/2009 | Wang | |
| 2010/0198511 A1 | 8/2010 | Hunter | |
| 2011/0021166 A1 | 1/2011 | Walley | |
| 2012/0146850 A1 | 6/2012 | Liu | |

(Continued)

FOREIGN PATENT DOCUMENTS

| CN | 102594946 A | * 7/2012 | ............. H01Q 1/243 |
|---|---|---|---|
| CN | 108155457 A | * 6/2018 | ............. H01Q 1/243 |

OTHER PUBLICATIONS

"Differential GPS (DGPS)" in F. Hargrave, Hargrave's Communications Dictionary, Wiley. [Online]. Hoboken, New Jersey, 2001 [retrieved on Mar. 12, 2020]. Retrieved from the internet: <URL: https://search.credoreference.com/content/entry/hargravecomms/differential_gps_dgps/0?institutionId=743>. (2 pages).

(Continued)

*Primary Examiner* — Harry K Liu
(74) *Attorney, Agent, or Firm* — Rowan Tree Law Group, PLLC; Carson C. K. Fincham

(57) ABSTRACT

Systems and methods for selective and/or opportunistic GNSS/GPS navigation that actively mask or filter satellite signals based on identified "clear sky" or "obstructed sky" regions.

20 Claims, 16 Drawing Sheets

(56) References Cited

U.S. PATENT DOCUMENTS

| | | |
|---|---|---|
| 2013/0002477 A1 | 1/2013 | Dehnie |
| 2013/0162477 A1 | 6/2013 | Waters |
| 2015/0045072 A1 | 2/2015 | Chao |
| 2015/0276934 A1 | 10/2015 | Ramlall |
| 2015/0338521 A1 | 11/2015 | Bromley |
| 2018/0196142 A1 | 7/2018 | Levy |
| 2021/0124057 A1* | 4/2021 | Luo .................. G01S 19/21 |
| 2022/0397680 A1 | 12/2022 | Lacaze |

OTHER PUBLICATIONS

"Kalman Filter" in F. Hargrave, Hargrave's Communications Dictionary, Wiley. [Online]. Hoboken, New Jersey, 2001 [retrieved on Jul. 10, 2018]. Retrieved from the internet: <URL: htpps://search.credoreference.com/content/entry/hargravecomms/kalm_filter/0?institutionId=743>. (2 pages).

B.W. Parkinson et al., Global Positioning System: Theory and Applications, vol. 1; Progress in Astronautics and Aeronatics, vol. 163 American Institute of Aeronautics and Astronautics, Inc., p. 10-11. (Year: 1996).

B.W. Parkinson et al., Global Positioning System: Theory and Applications, vol. I; Progress in Astronautics and Aeronatics, vol. 163, American Institute of Aeronautics and Astronautics, Inc., p. 136, 1996 (Year: 1996) 3 pages.

Dictionary definition for Ladar. (1992). In C. G. Morris (Ed.), Academic Press Dictionary of Science and Technology (4th ed.). Oxford, UK: Elsevier Science & Technology. Retrieved from https://search.credoreference.com/content/entry/apdst/ladar/0 (Year: 1992) 2 pages.

Final Office Action for U.S. Appl. No. 15/168,460 dated Apr. 26, 2021; 18 pps.

Final Office Action for U.S. Appl. No. 15/168,460 dated Dec. 26, 2019; 24 pps.

Final Office Action for U.S. Appl. No. 15/168,460 dated Mar. 14, 2019; 19 pps.

Final Office Action for U.S. Appl. No. 17/382,823 dated Feb. 21, 2024 ; 24 pps.

Groves, P.D., GNSS, Interial, and Multisensor Integrated Navigation Systems. Second Edition, Artech House, 2013, pp. 6-7 and 163-168.

Haykin, S., "Kalman Filters" in Adaptive Filter Theory. Third Edition, Prentice Hall, 1996, pp. 302-337.

International Search Report for PCT/US23/23764 dated Dec. 20, 2023; 4 pps.

Israeli Application No. 235356, filed Oct. 27, 2014. (31 pages).

Office Action for U.S. Appl. No. 15/168,460 dated Aug. 2, 2018; 23 pps.

Office Action for U.S. Appl. No. 15/168,460 dated Jul. 8, 2020; 22 pps.

Office Action for U.S. Appl. No. 15/168,460 dated Mar. 19, 2020; 21 pps.

Office Action for U.S. Appl. No. 15/168,460 dated Sep. 6, 2019; 24 pps.

Office Action for U.S. Appl. No. 17/382,823 dated Oct. 13, 2023; 19 pps.

Office Action for U.S. Appl. No. 17/382,823 dated Nov. 14, 2022; 14 pps.

Office Action for U.S. Appl. No. 17/382,823 dated Mar. 31, 2023; 16 pps.

P.W. Nieuwejaar, Aiding and Integration of a GPS Receiver, p. 8-1 to 8-10, in The Navstar GPS System, AGARD Lecture Series, No. 161, Sep. 1988 (Year: 1988) 13 pages.

R.B. Dayton et al., Flight Demonstration of Two and Three Satellite Navigation, Proceedings of the International Technical Meeting of the Satellite Division of The Institute of Navigation (ION GPS 1988), p. 259-266, Sep. 1988 (Year: 1988).

Written Opinion for PCT/US23/23764 dated Dec. 20, 2023; 7 pps.

\* cited by examiner

US 12,123,955 B2

SYSTEMS AND METHODS FOR SELECTIVE GLOBAL NAVIGATION SATELLITE SYSTEM (GNSS) NAVIGATION

CROSS-REFERENCE TO RELATED APPLICATIONS

This application claims benefit and priority under 35 U.S.C. § 119(e) to, and is a Non-provisional of, U.S. Provisional Patent Application No. 63/209,657 filed on Jun. 11, 2021 and titled "SYSTEMS AND METHODS FOR OPPORTUNISTIC GLOBAL POSITIONING SYSTEM (GPS) NAVIGATION", which is hereby incorporated by reference herein in its entirety.

SUMMARY

Embodiments of the invention provide systems and/or methods for selective and/or opportunistic Global Navigation Satellite System (GNSS) and/or Global Positioning System (GPS) navigation, such as by selectively mapping "open sky" or "clear sky" locations to received GPS signals and masking and/or filtering signals based on the open/clear sky data.

BACKGROUND

In urban and forested settings, buildings and vegetation often affect signals transmitted from Global Navigation Satellite System (GNSS) devices such as Global Positioning System (GPS) satellite transmitters. In some cases, the direct signals do not achieve the receiver, on others, the signal bounces off structures and then reaches the receiver. This is usually called "multipath". Because of the nature of how GNSS solutions are computed, multipath signals create errors in the solution that are not acceptable for many applications. In simple terms, by definition, these reflected paths are longer than the direct path that would have been traversed without reflecting and therefore when the time of flight is computed they erroneously shift the solution to a ghost location. These reflections are not easy to filter as they cannot be modeled as Gaussian noise, and they can persist for long periods of time forcing Kalman filters usually used for filtering these solutions to drift to these ghost solutions. Recognizing that a particular signal is a direct measurement or a reflection measurement is under normal circumstances unobservable as the antennas used for traditional GNSS reception are omnidirectional and do not measure the direction of the signal being received.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1A:
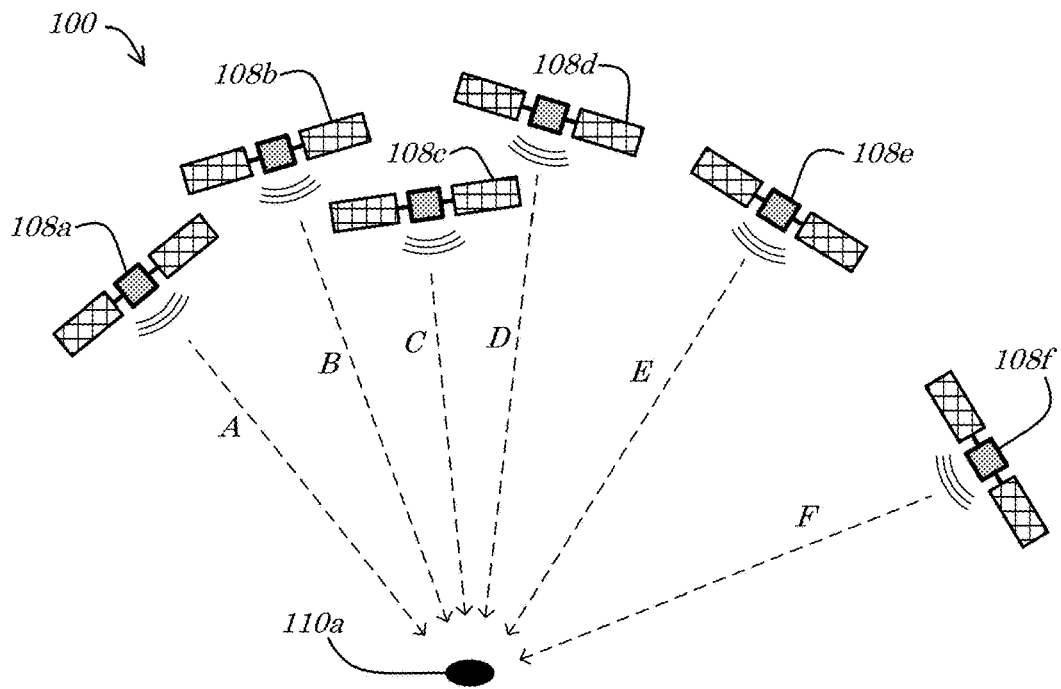
FIG. 1A, FIG. 1B, FIG. 1C, and FIG. 1D are block diagrams of a typical Global Navigation Satellite System (GNSS)

Referring initially to FIG. 1A, FIG. 1B, FIG. 1C, and FIG. 1D, block diagrams of a typical Global Navigation Satellite System (GNSS) (and/or Global Positioning System (GPS)) 100 are shown. The GNSS 100 is well-known and in common commercial usage around the world for personal, commercial, and military location-finding and navigation and may comprise one or more specific satellite constellation systems such as a GPS, BeiDou Navigation Satellite System (BDS), the Galileo system, the GLObalnaya NAvigazionnaya Sputnikovaya Sistema (GLONASS), the Indian Regional Navigation Satellite System (IRNSS)/Navigation Indian Constellation (NavIC), and/or the Quasi-Zenith Satellite System (QZSS). In the typical exemplary cases depicted in FIG. 1A, FIG. 1B, FIG. 1C, and FIG. 1D, the GNSS 100 may comprise one or more obstacles 102a-f that may interfere with the transmission of various signals "A", "B", "C", "D", "E", "F" from various respective satellites 108a-f to a receiver 110a-c The GNSS calculations/analysis required to derive a location utilizing the GNSS 100 are well-understood. In a perfect (i.e., unobstructed) scenario as depicted in FIG. 1, for example, each satellite 108a-f broadcasts it's position and time via the respective signals "A", "B", "C", "D", "E", "F". These signals "A", "B", "C", "D", "E", "F" arrive at a first receiver 110a some time later. Multiplying the time difference (between the transmission time and time of receipt of each signal "A", "B", "C", "D", "E", "F") by the speed of light gives the "pseudorange" to each respective satellite 108a-f. Given pseudoranges to any four (4) satellites 108a-f, the position ($x_0$, $y_0$, $z_0$) of the first receiver 110a, and the clock time ($t_0$), can be computed. If more than four (4) satellites 108a-f are visible (as depicted in FIG. 1A), then more pseudoranges are available, and the problem is over constrained. Solving for the position ($x_0$, $y_0$, $z_0$) of the first receiver 110a, and the clock time ($t_0$) can be accomplished utilizing a solution such as weighted least squares. Unfortunately, multiple problems can occur that reduce the accuracy of the pseudoranges.

Figure 1B:
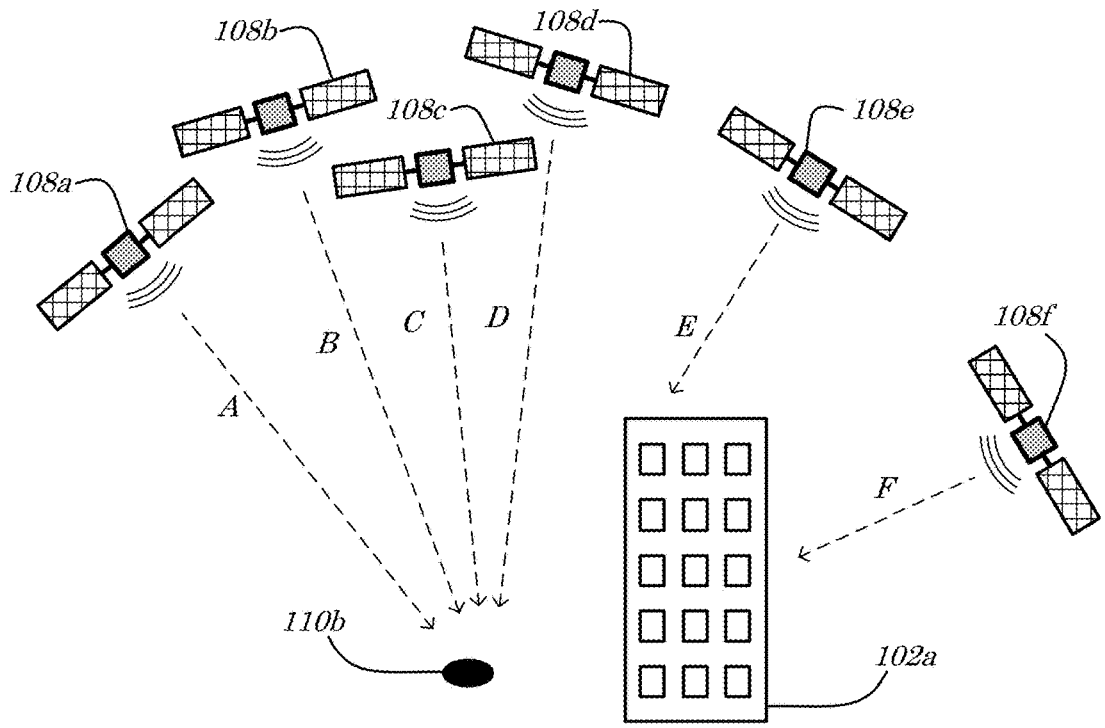

As depicted in FIG. 1B, for example, while a first subset of signals "A", "B", "C", "D" from a first subset of satellites 108a-d are able to reach a second receiver 110b unobstructed, the line of sight of second subset of signals "E", "F" from a second subset of satellites 108e-f is temporarily obstructed by a first obstacle 102a, e.g., a building as depicted. The first obstacle 102a may generally comprise any signal-blocking object such as tree canopies, bridges, tunnels, mountains, etc. The satellites 108a-f do, however, move across the sky. Any or all of the second subset of satellites 108e-f that are currently blocked may move from out of the shadow of the first obstacle 102a and become unblocked and any or all of the first subset of satellites 108*a-d* that are currently unblocked may become blocked. In addition, if the second receiver 110*b* moves around the first obstacle 102*a*, different satellites 108*a-f* may become blocked or unblocked by the first obstacle 102*a*. In this scenario of the GNSS 100, a solution can still be computed using data from the four (4) satellites 108*a-d* that remain in line of sight (i.e., the first subset of satellites 108*a-d*). Some advanced navigation systems (not shown) that include components such as chip scale atomic clocks and inertial measurement units, do not require four (4) satellites 108*a-d* at a time and can use data from just a single visible satellite 108*a-d*.

Figure 1C:
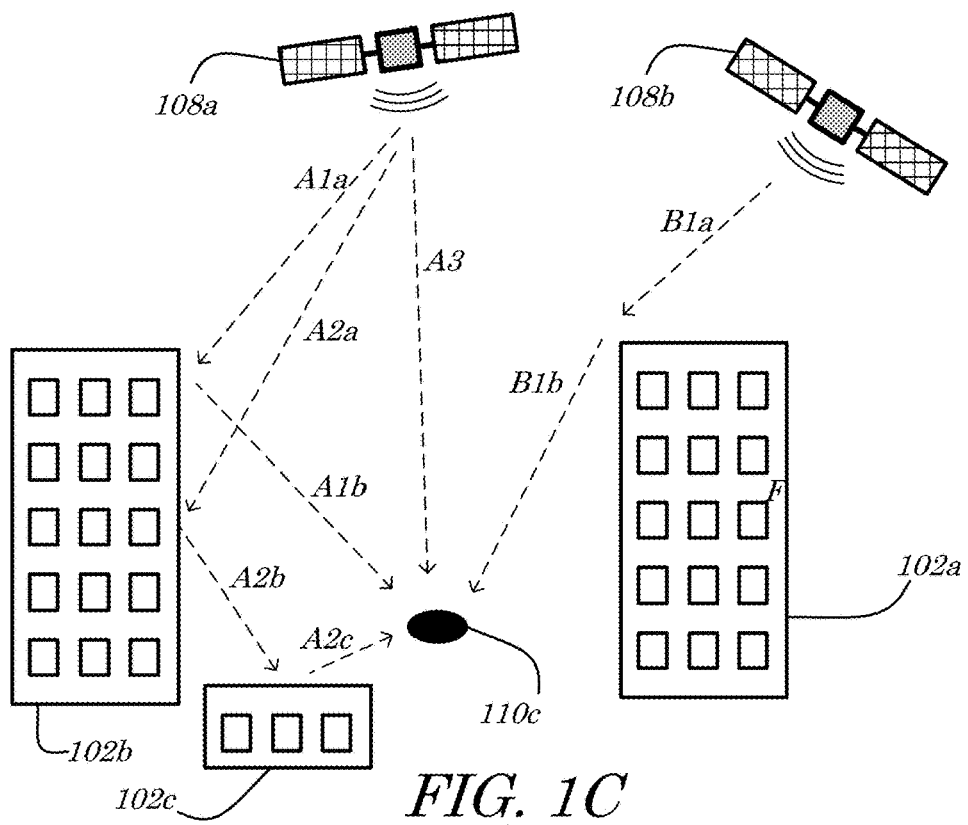

Whether the signals "A", "B", "C", "D", "E", "F" are blocked or not, the GNSS 100 is also susceptible to errors due to "multipath" signals. As depicted in FIG. 1C, for example, a third receiver 110*c* may be situated between multiple obstacles 102*a-c* (e.g., different buildings, as depicted). Multipath occurs when a radio signal "A1*a*", "A2*a*", "B1*a*" from a satellite 108*a-b* reaches the antenna from a path "A1*b*", "A2*b*", "A2*c*", "B1*b*" that is not the direct line of sight path "A3". This occurs when the signal reflects off of (signals "A1*a*", "A1*b*", "A2*a*", "A2*b*", "A2*c*") an obstacle 102*a-c* or diffracts (bends) around it (signals "B1*a*", "B1*b*"). As depicted, each "multipath" path can have a single hop/bend (signals "A1*a*", "A1*b*", "B1*a*", "B1*b*") or multiple hops/bends (signals "A2*a*", "A2*b*", "A2*c*"). Multipath can occur both when the direct line of sight path is blocked (e.g., with respect to a second satellite 108*b*) and when it is clear (e.g., with respect to a first satellite 108*a*). The paths with a hop/bend (signals "A1*a*", "A1*b*", "A2*a*", "A2*b*", "A2*c*", "B1*a*", "B1*b*") are longer than the straight line of sight path "A3" resulting in the measured pseudoranges being longer than they should be. Errors in the pseudorange from a satellite 108*a-b* result in errors in the computed position and time of the third receiver 110*c*. When multiple paths (signals "A1*b*", "A2*c*", "A3") from one satellite 108*a* reach the third receiver 110, the measured pseudorange to that third receiver 110 is an "averaged" range of each overall path ("A1*a*", "A1*b*", "A2*a*", "A2*b*", "A2*c*", "A3"). This "average" depends on the strength of the reflections, antenna characteristics, etc. For example, GPS antennas may use a strong ground plane to block ground reflection or have polarization to help block reflections.

Figure 1D:
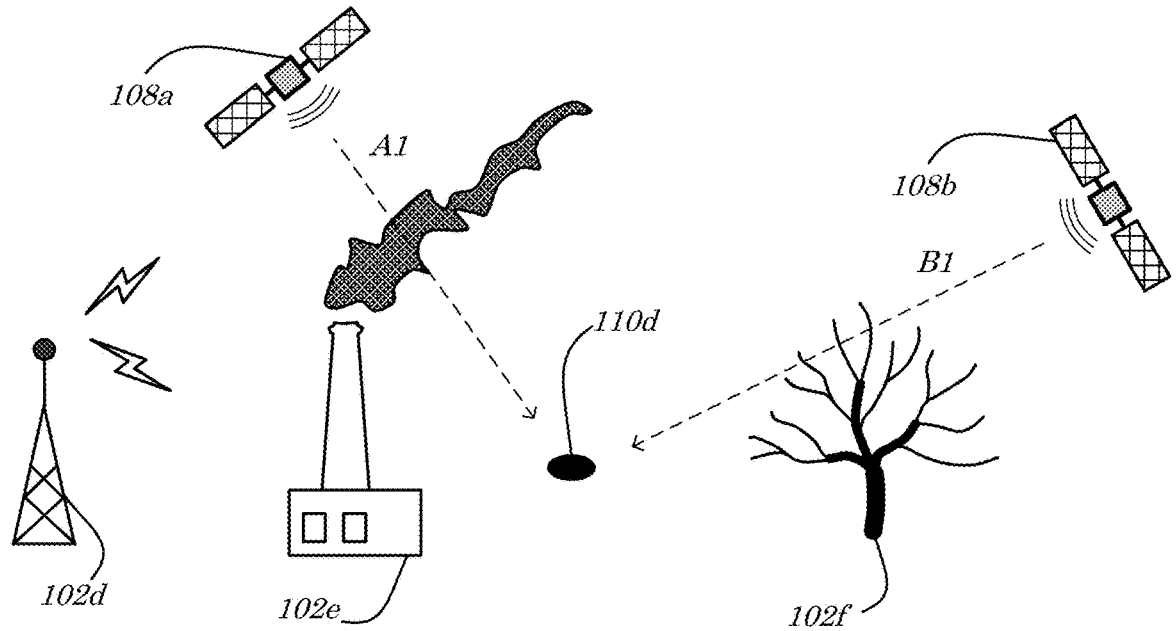

As depicted in FIG. 1D, natural and artificial interference can occur when the line of sight path "A1", "Bb" to a fourth receiver 110*d* is partially blocked by small or thin obstacles 102*d-f* such as other signals 102*d*, atmospheric effects such as smoke 102*e*, and bare trees or wires 102*f*. In these cases, the signal "A1", "B1" is weak or malformed, which can result in a noisy pseudorange. Signal jamming devices (e.g., a source of the other signals 102*d*), either deliberate or unintentional, increase background noise resulting in a relatively reduced signal strength and a noisy pseudorange or complete loss of signal "A1", "B1".

Receivers 110*a-d* can be designed to provide some level of mitigation to these problems. Antennas (not separately shown) can have good Right-Hand Circular Polarization that reduce multipath reception, for example, or receivers 110*a-d* can monitor the signal-to-noise ratios or the time series of range residual variance to help detect and reject errors. These and other methods try to detect errors when they occur but they do not anticipate when errors will occur.

According to some embodiments, these and other deficiencies of prior GPS systems are remedied by systems and/or methods for selective and/or opportunistic GNSS/GPS navigation, such as by selectively mapping "open sky" or "clear sky" locations to received GNSS/GPS signals. In some embodiments, for example, information indicative of locations having "clear sky" access may be utilized to modify the typical GNSS/GPS navigational processing routines/calculations. For some applications, the areas of "open sky" that provide direct line of sight to the satellites are known. For example, a bus traversing a city may know that at a particular intersection, only satellites to the North may be viewable. In some embodiments, a database of known "open sky" or "clear sky" areas or locations may be utilized to qualify the chance that a GNSS pseudo range received is a direct or a reflected/bent measurement, and therefore it can be eliminated or de-emphasized from the solution. According to some embodiments, a system may utilize at least one (1) of two (2) concepts that aid the selective elimination of suspect satellites:

1. sequential GPS concept uses an accurate clock (e.g., a Chip Scale Atomic Clock (CSAC)) and an inertial system to sequentially acquire position by reading pseudoranges from the different satellites at different times and computing the solution by utilizing the inertial solution and accurate clock to create the system of equations necessary to solve for position and time; and
2. directional antennas can be used to receive only in areas where there is "open sky".

Although not necessary in some embodiments, these concepts may significantly improve GNSS/GPS performance by allowing the system to still acquire fixes after some satellites (the multipath ones) are eliminated. It is worth noting that the frequencies in standard GNSS satellites were selected as a compromise between accuracy and coverage. In other words, the designers purposely selected frequencies that create some reflections to increase the chances of getting the minimum four (4) simultaneous satellites necessary to get a fix. With the advent of CSAC devices and sequential GPS concepts, this requirement is no longer valid and a selective and/or opportunistic method such as described herein may be simpler and more effective to implement.

II. Selective and/or Opportunistic GNSS/GPS Navigation Systems

Figure 2:
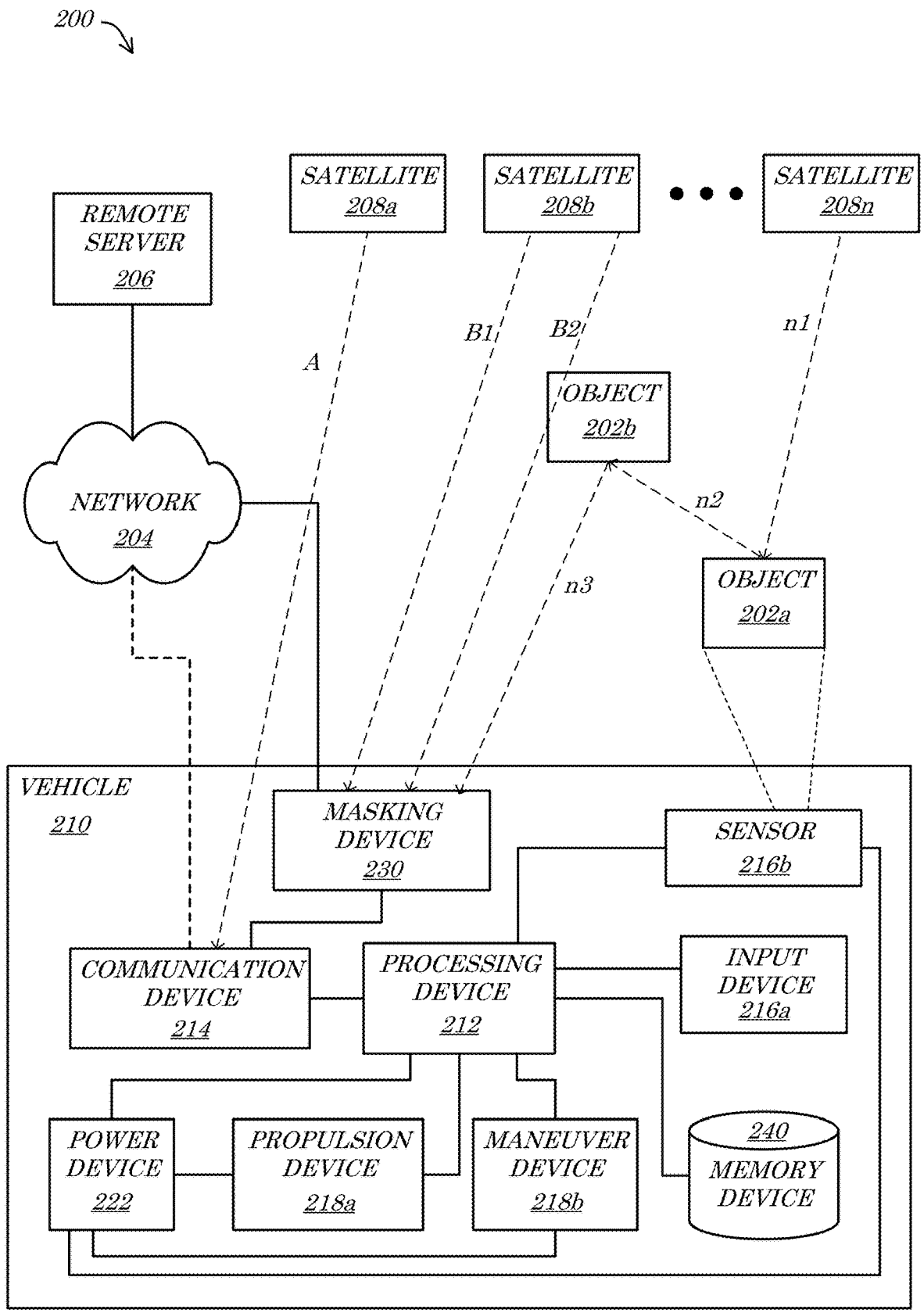
FIG. 2 is a block diagram of a system according to some embodiments.

Turning now to FIG. 2, a block diagram of a system 200 according to some embodiments is shown. In some embodiments, the system 200 may comprise a plurality of objects 202*a-b*, a network 204, a remote server 206, a plurality of satellites 208*a-n* (and/or other navigation signal sources), and/or a vehicle 210. The system 200 may comprise, for example, a GNSS in which the vehicle 210 resolves geolocation and/or positioning information of the vehicle 210 based on communications via the network 204 and/or from one or more of the satellites 208*a-n* (e.g., via respective signals "A", "B1", "B2", "n1", "n2", "n3"). The vehicle 210 may comprise, ins some embodiments, a processing device 212, a communication device 214, an input device 216*a*, a sensor 216*b*, a propulsion device 218*a*, a maneuver device 218*b*, and/or a power device 222. In some embodiments, the vehicle 210 may be in communication with, e.g., via the network 204, the remote server 206. According to some embodiments, the vehicle 210 may comprise a masking device 230 and/or a memory device 240.

Fewer or more components 202*a-b*, 204, 206, 208*a-n*, 210, 212, 214, 216*a-b*, 218*a-b*, 222, 230, 240 and/or various configurations of the depicted components 202*a-b*, 204, 206, 208*a-n*, 210, 212, 214, 216*a-b*, 218*a-b*, 222, 230, 240 may be included in the system 200 without deviating from the scope of embodiments described herein. In some embodiments, the components 202*a-b*, 204, 206, 208*a-n*, 210, 212, 214, 216a-b, 218a-b, 222, 230, 240 may be similar in configuration and/or functionality to similarly named and/or numbered components as described herein. In some embodiments, the system 200 (and/or portion thereof) may comprise GNSS platform programmed and/or otherwise configured to execute, conduct, and/or facilitate one or more methods (e.g., the method 700 of FIG. 7 herein) for selective and/or opportunistic GNSS/GPS navigation, as described herein.

According to some embodiments, the objects 202a-b may comprise any type, configuration, and/or quantity of objects such as any number or type of obstacles that may block, bend, reflect, refract, distort, and/or otherwise interfere with one or more of the signals "A", "B1", "B2", "n1", "n2", "n3". As depicted for non-limiting purposes of example in FIG. 2, a primary signal "n1" from an $n^{th}$ satellite 208n may be reflected off of a first object 202a to define a secondary signal "n2" and/or the secondary signal "n2" may be reflected off of a second object 202b to define a tertiary signal "n3". In such a case, the objects 202a-b may comprise buildings, terrain features such as hills or mountains, etc. In some embodiments, a first signal "B1" from a second satellite 208b may be received without obstruction by the vehicle 210 while a second signal "B2" from the second satellite 208b may pass through (and/or otherwise be affected by) the second object 202b. In such a case, the second object 202b may comprise natural and/or man-made diffusive materials such as a tree canopy (branches and/or leaves), electrical wires, smoke, haze, moisture (e.g., mist, rain, etc.), and/or chaff (i.e., man-made and/or man-implemented diffusive, reflective, and/or obstructive materials). According to some embodiments, one or more of the objects 202a-b may comprise one or more vehicles (e.g., additional instances of the vehicle 210).

The network 204 may, according to some embodiments, comprise a Local Area Network (LAN; wireless and/or wired), cellular telephone, Bluetooth®, Near Field Communication (NFC), and/or Radio Frequency (RF) network with communication links between the remote server 206 and the vehicle 210. In some embodiments, the network 204 may comprise direct communication links between any or all of the components 206, 208a-n, 210, 212, 214, 216a-b, 218a-b, 222, 230, 240 of the system 200. The sensor 216b may, for example, be directly interfaced or connected to one or more of the processing device 212 and/or the remote server 206 via one or more wires, cables, wireless links, and/or other network components, such network components (e.g., communication links) comprising portions of the network 204. In some embodiments, the network 204 may comprise one or many additional or alternate links or network components other than those depicted in FIG. 2. The vehicle 210 may, for example, be connected to the remote server 206 via various cell towers, routers, repeaters, ports, switches, and/or other network components that comprise the Internet and/or a cellular telephone (and/or Public Switched Telephone Network (PSTN)) network, and which comprise portions of the network 204.

While the network 204 is depicted in FIG. 2 as a single object, the network 204 may comprise any number, type, and/or configuration of networks that is or becomes known or practicable. According to some embodiments, the network 204 may comprise a conglomeration of different sub-networks and/or network components interconnected, directly or indirectly, by the components 206, 208a-n, 210, 212, 214, 216a-b, 218a-b, 222, 230, 240 of the system 200. The network 204 may comprise one or more cellular telephone networks with communication links between the communication device 214 and the remote server 206, for example, and/or may comprise an NFC or other short-range wireless communication path, with communication links between the vehicle 210 and one or more of the objects 202a-b, for example.

According to some embodiments, the remote server 206 may comprise any type or configuration of a computerized processing device, such as a PC, laptop computer, computer server, database system, and/or other electronic device, devices, or any combination thereof. In some embodiments, the remote server 206 may be owned and/or operated by a third party (i.e., an entity different than any entity owning and/or operating either the vehicle 210 and/or the satellites 208a-n; such as a certificate, authentication, data storage, image analysis, mapping, demographic, graphical element, and/or cryptographic service provider). The remote server 206 may comprise, for example, a server via which cloud-based services, such as AI processing and/or mapping services (e.g., including data descriptive of the objects 202a-b) are provided to the vehicle 210. According to some embodiments, the remote server 206 may comprise a plurality of devices (e.g., sensors, transmitters, and/or computing devices) and/or may be associated with a plurality of third-party entities. In some embodiments, the remote server 206 may comprise the memory device 240 (or a portion thereof), such as in the case the remote server 206 comprises a third-party data storage service, device, and/or system, such as the Amazon® Simple Storage Service (Amazon® S3™) available from Amazon.com, Inc. of Seattle, WA or an open-source third-party database service, such as MongoDB™ available from MongoDB, Inc. of New York, NY.

In some embodiments, the satellites 208a-n may comprise any type and/or quantity of earth-orbiting and/or airborne devices that form a communication network (e.g., the network 204 and/or a separate network comprising the signals "A", "B1", "B2", "n1", "n2", "n3"). The communication network may comprise, for example, a geo-location network such as a GNSS/GPS constellation of earth-orbiting satellites 208a-n. According to some embodiments, one or more of the satellites 208a-n may comprise in-atmosphere objects such as drones and/or other aircraft (heavier-than-air or lighter-than-air) that generate any or all of the signals "A", "B1", "B2", "n1", "n2", "n3". In the case that the satellites 208a-n comprise a GPS constellation of satellites, the satellites 208a-n may comprise a subset of twenty-seven (27) total active medium Earth-orbit Space Vehicles (SV) that are (e.g., but-for the objects 202a-b) in line-of-sight with the vehicle 210 at a particular time.

According to some embodiments, the vehicle 210 may comprise any type, configuration, and/or quantity of vehicle, manned, unmanned, autonomous, or semi-autonomous, that is or becomes known or practicable. The vehicle 210 may comprise, for example, an autonomous path-following transportation vehicle that is operable to follow one or more predefined and/or automatically computed paths (not shown) and/or a manned vehicle 210. In some embodiments, the vehicle 210 may comprise the processing device 212 such as a Central Processing Unit (CPU) that executes instructions (not shown) stored in the memory device 240 to operate in accordance with embodiments described herein. The processing device 312 may, for example, execute one or more programs, modules, and/or routines (such as GNSS/GPS processing routines utilizing some or all of the signals "A", "B1", "B2", "n1", "n2", "n3") that facilitate localization, navigation, and/or movement of the vehicle 210. The processing device 212 may comprise, in some embodiments, one or more Eight-Core Intel® Xeon® 7500 Series electronic processing devices.

According to some embodiments, the communication device 214 may comprise any wired and/or wireless communication object and/or network device such as, but not limited to, a Network Interface Card (NIC), a Radio Frequency (RF) antenna, transmitter, encoder, decoder, and/or receiver. In some embodiments, the communication device 214 may comprise hardware, software, and/or firmware operable to enable wireless communications including, but not limited to, encoding and/or decoding modules, filters, encryption and/or decryption modules, wireless signal triangulation devices, and/or atomic clock modules. In some embodiments, the communication device 214 may comprise a GNSS/GPS antenna and/or receiver that, e.g., in cooperation with the processing device 212, receives and processes some or all of the signals "A", "B1", "B2", "n1", "n2", "n3" to determine a geo-location of the vehicle 210. In some embodiments, the communication device 214 may comprise an omnidirectional antenna.

According to some embodiments, the input device 216a may comprise one or more of a throttle, a steering, and a brake control mechanism and/or interface via which a human operator may control the speed and/or direction of the vehicle 210. The operator may, for example, utilize the input device 216a to define a control action to define the speed of the vehicle 210a s well as to make decisions such as when to stop or to continue past, around, over, and/or under one or more of the objects 202a-b. According to some embodiments, the input device 216a may comprise one or more switches, levers, wheels, pedals, and/or interface elements capable of communicating speed, direction, etc.

In some embodiments, the sensor 216b may comprise may any type, configuration, and/or quantity of sensor devices that are or become known or practicable. In some embodiments, the sensor 216b may comprise a Light Detection and Ranging (LiDAR), LAser Detection and Ranging (LADAR), radar, sonar, Infrared Radiation (IR), RF, ultrasound, structured light, and/or imaging (e.g., stereo vision and/or 3-D camera) device operable to acquire data descriptive of one or more of the objects 202a-b and/or one or more of the satellites 208a-n. According to some embodiments, the sensor 216b may also or alternatively comprise a gyroscope, image, audio, and/or video capture and/or recording device, chemical detection device, and/or a light sensor. According to some embodiments, the sensor 216b may comprise various movement sensors such as speed/velocity sensors, pressure sensors, temperature sensors, accelerometers, Inertial Measurement Unit (IMU) devices, and/or tilt sensors. In some embodiments, the sensor 216b may comprise one or more sensors operable to detect a bearing, heading, angle, and/or location of one or more of the objects 202a-b and/or satellites 208a-n. The sensor 216b may comprise a camera and/or LiDAR device that detects, locates, and/or characterizes (e.g., in coordination with the processing device 212, identifies and/or determines one or more characteristics of; such a shape, size, composition, mass, density, etc.) the second object 202b, for example, and/or may comprise a receiver that is configured to measure a bearing to the $n^{th}$ satellite 208n. According to some embodiments, the sensor 216b (and/or the processing device 212) may utilize both information descriptive of the second object 202b and the $n^{th}$ satellite 208n (and/or the signals "n1", "n2", "n3" therefrom) to determine that the second object 202b is likely to be affecting the signals "n1", "n2", "n3" from the $n^{th}$ satellite 208n.

According to some embodiments, the propulsion device 218a may comprise any type, configuration, and/or quantity of propulsion devices that are operable to move the vehicle 210 from one location to another. The propulsion device 218a may comprise, for example, one or more motors, engines, gears, drives, propellers, fans, jets, nozzles, wheels, treads, and/or magnetic propulsion devices. In some embodiments, the maneuver device 218b may comprise any type, quantity, and/or configuration of mechanical, electrical, and/or electro-mechanical devices that are operable to control the path of the vehicle 210 (a/or the direction of thrust output by the propulsion device 218a). The maneuver device 218b may comprise, for example, steering linkage, actuators, control surfaces, thrust vectoring devices, etc. In some embodiments, the maneuver device 218b may be coupled to and/or in communication with the propulsion device 218a. The maneuver device 218b may comprise, for example, a steer-by-wire system that permits computerized control (e.g., via the processing device 212 and/or the remote server 206) of the maneuvering of the vehicle 210. The maneuver device 218b and the propulsion device 218a may, for example, operate in a coordinated fashion (e.g., in response to commands from the processing device 212) to cause the vehicle 210 to follow a desired path and/or route.

According to some embodiments, the power device 222 may be electrically coupled to provide power to any or all of the propulsion device(s) 218a, the communication device 214, the processing device 212, the input device 216a, the sensor 216b, and/or the maneuver device 218b. In some embodiments, the power device 222 may comprise a power source such as a solar panel, inertial generator, on-board generator, alternator, fuel-cell, external power supply port, etc. According to some embodiments, the power device 222 may also or alternatively comprise a power storage device such as one or more capacitors, batteries, fuel reservoirs or tanks, etc.

In some embodiments, the vehicle 210 may comprise and/or be coupled to the masking device 230. The masking device 230 may, for example, be coupled, oriented, and/or disposed to measure, interpret, intercept, and/or filter or "mask" one or more of the signals "A", "B1", "B2", "n1", "n2", "n3" and/or communications to and/or from the network 204. While the term "masking" is utilized for convenience of description with respect to the masking device 230, in some embodiments the masking device 230 may be operative to selectively filter and/or process the signals "A", "B1", "B2", "n1", "n2", "n3" without performing a "masking" thereof. The masking device 230 may, in some embodiments, comprise a physical/mechanical and/or electronic device that actively "masks" or filters certain signals "A", "B1", "B2", "n1", "n2", "n3" such as the distorted second signal "B2" from the second satellite 208b and/or the tertiary signal "n3" from the $n^{th}$ satellite 208n. The masking device 230 may, for example, intercept and/or filter the signals "A", "B1", "B2", "n1", "n2", "n3" such that only a first subset of the signals "A", "B1" are provided to and/or utilized by the vehicle 210 (e.g., the communication device 214, the sensor 216b, and/or the processing device 212 thereof) in determining a localization for the vehicle 210. In other words, GNSS/GPS processing conducted by the vehicle 210 may only utilize (e.g., due to the masking device 230) the first subset of signals "A", "B1" as input in a GNSS/GPS geo-positioning calculation and/or may selectively de-value or weight a second subset of signals "B2", "n1", "n2", "n3" that are determined to have impeded line-of-sight between their sources (the second satellite 208b and the $n^{th}$ satellite 208n) and the vehicle 210.

In some embodiments, the memory device 240 may store various logic, code, and/or applications, each of which may, when executed, participate in, facilitate, and/or cause selective and/or opportunistic GNSS/GPS navigation processing, as described herein. In some embodiments, the memory device 240 may comprise any type, configuration, and/or quantity of data storage devices that are or become known or practicable. The memory device 240 may, for example, comprise an array of optical and/or solid-state memory cards or hard drives configured to store sensor data, geo-location data, maneuvering data, object location and/or classification data, navigation data, road network data, rules of the road data, routing data (e.g., analysis formulas and/or mathematical models), credentialing and/or communication instructions, codes, and/or keys, and/or various operating instructions, drivers, etc. In some embodiments, the memory device 240 may comprise a solid-state and/or non-volatile memory card (e.g., a Secure Digital (SD) card, such as an SD Standard-Capacity (SDSC), an SD High-Capacity (SDHC), and/or an SD eXtended-Capacity (SDXC) and any various practicable form-factors, such as original, mini, and micro sizes, such as are available from Western Digital Corporation of San Jose, CA While the memory device 240 is depicted as a stand-alone component of the vehicle 210, the memory device 240 may comprise multiple components. In some embodiments, a multi-component memory device 240 may be distributed across various devices and/or may comprise remotely dispersed components. Any of the vehicle 210, the satellites 208a-n, the objects 202a-b, and/or the remote server 206 may comprise the memory device 240 or a portion thereof, for example.

Fewer or more components 202a-b, 204, 206, 208a-n, 210, 212, 214, 216a-b, 218a-b, 222, 230, 240 and/or various configurations of the depicted components 202a-b, 204, 206, 208a-n, 210, 212, 214, 216a-b, 218a-b, 222, 230, 240 may be included in the system 200 without deviating from the scope of embodiments described herein. In some embodiments, the components 202a-b, 204, 206, 208a-n, 210, 212, 214, 216a-b, 218a-b, 222, 230, 240 may be similar in configuration and/or functionality to similarly named and/or numbered components as described herein. In some embodiments, the system 200 (and/or portion thereof) may comprise a GNSS platform programmed and/or otherwise configured to execute, conduct, and/or facilitate one or more methods for selective and/or opportunistic GNSS/GPS navigation, as described herein.

Figure 3:
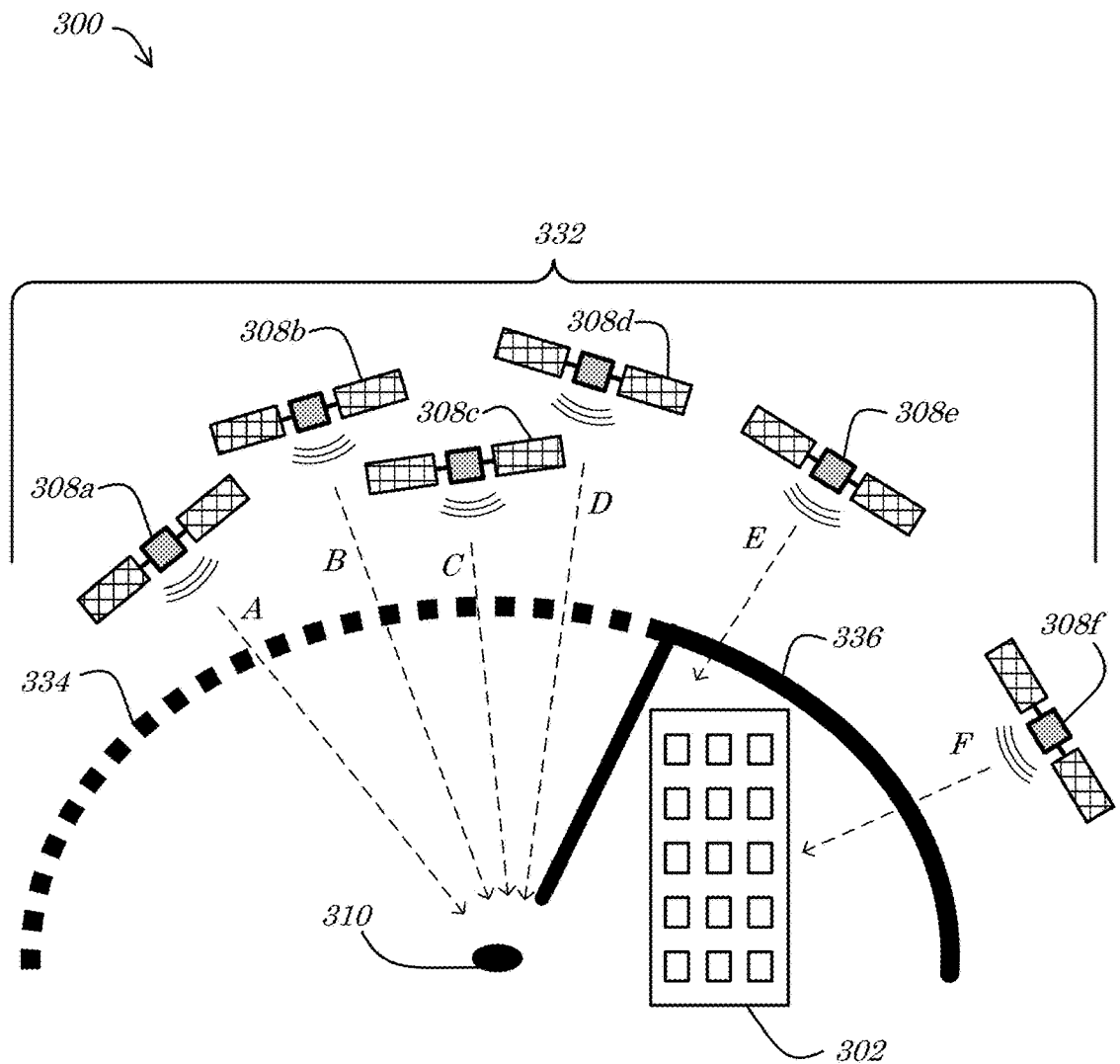
FIG. 3 is a block diagram of a system according to some embodiments.

Referring now to FIG. 3, a block diagram of a system 300 according to some embodiments is shown. The system 300 may comprise, for example, an environment in which an object 302 is disposed and in which a GNSS/GPS (and/or another navigation system comprising a constellation of remote navigation signal transmitters) operates. The GNSS/GPS may comprise a constellation of satellites 308a-f that transmit and/or broadcast signals "A", "B", "C", "D", "E", "F" and a receiver 310 that utilizes the signals to resolve a geo-location of the receiver 310. In some embodiments, the constellation of satellites 308a-f may be disposed across a visible portion of sky 332 and/or may comprise a subset of a total constellation of satellites 308a-f, with other members of the constellation not being visible to (e.g., not having a line-of-sight to) the receiver 310 (and accordingly not being shown in FIG. 3). According to some embodiments, a selective and/or opportunistic GNSS/GPS navigation process may be implemented by the receiver 310. The receiver 310 may identify, for example, that the object 302 is oriented and/or positioned (e.g., with respect to the receiver 310) such that it does not interfere with a first subset of signals "A", "B", "C", "D" from a first subset of the satellites 308a-d, but that it does block, bend, reflect, refract, obstruct, and/or otherwise is likely to negatively alter a second subset of signals "E", "F" from a second subset of the satellites 308e-f. In some embodiments, an approximate (e.g., previously derived and/or computed based on movement data) position of the receiver 310 and a map of the local terrain (e.g., data identifying the object 302) may be utilized to generate a "mask" denoting a first subset of sky 334 (e.g., of the visible portion of sky 332) that is clear of obstructions (i.e., "clear sky") and a second subset of sky 336 (e.g., of the visible portion of sky 332) that is obstructed (e.g., by the object 302; i.e., "obstructed sky"). According to some embodiments, the receiver 310 may only (e.g., selectively and/or opportunistically) utilize the first subset of satellites 308a-d located in the "clear sky" region (i.e., the first subset of sky 334) to compute the GNSS/GPS-based geo-position and time. The second subset of satellites 308e-f in the "obstructed sky" region (i.e., the second subset of sky 336) may, for example, be "masked" off and/or filtered out and/or may otherwise be prevented from being utilized as input by the receiver 310 (e.g., utilizing a "masking device such as a physical shield selectively positioned to block the second subset of sky 336 and/or an electronic filter, e.g., that excludes the "obstructed sky" signals "E", "F" based on the relative locations of the receiver 310, the object 302, and the second subset of satellites 308e-f; not separately shown). As the satellites 308a-f move across the sky they may enter or exit the masked area(s)/"obstructed sky" region(s) (i.e., the second subset of sky 336). As the receiver 310 moves in the local terrain (e.g., changing position with respect to the object 302), the area of sky that is obstructed/second subset of sky 336 will change as will the extends and/or bounds of the respective mask/filter. A database (not shown) may be utilized to determine the locations, extents, boundaries, and/or bearings of open sky/first subset of sky 334 and/or obstructed sky/second subset of sky 336. An approximate position of the receiver 310 may be utilized to retrieve mask data defining a mask of the sky that defines the second subset of sky 336 at a particular time. In some embodiments, the definition of the mask/second subset of sky 336 may be sensed utilizing a camera, LiDAR, Radar, and/or other sensor (not shown). In some embodiments, the receiver 310 may be utilized to receive pseudoranges and to lock with the first subset of satellites 308a-d in the unmasked/acceptable sky region/first subset of sky 334. Given the mask/second subset of sky 336 for a particular area, the second subset of satellites 308e-f that are not in view given the mask/second subset of sky 336 may be selectively eliminated or de-weighted from the geo-location computation. According to some embodiments, the masking device may comprise a directional antenna that may be selectively pointed, tuned, and/or otherwise restricted to the first subset of sky 334 and accordingly the receiver 310 may only process the first subset of satellites 308a-d (or the first subset of signals "A", "B", "C", "D" thereof) that are in "open sky". According to some embodiments, a sequential GPS concept/computation process may be utilized to find/resolve a geo-location fix.

Fewer or more components 302, 308a-f, 310, 332, 334, 336 and/or various configurations of the depicted components 302, 308a-f, 310, 332, 334, 336 may be included in the system 300 without deviating from the scope of embodiments described herein. In some embodiments, the components 302, 308a-f, 310, 332, 334, 336 may be similar in configuration and/or functionality to similarly named and/or numbered components as described herein. In some embodiments, the system 300 (and/or portion thereof) may comprise a GNSS platform programmed and/or otherwise configured to execute, conduct, and/or facilitate one or more methods (e.g., the method 700 of FIG. 7 herein) for selective and/or opportunistic GNSS/GPS navigation, as described herein.

Figure 4:
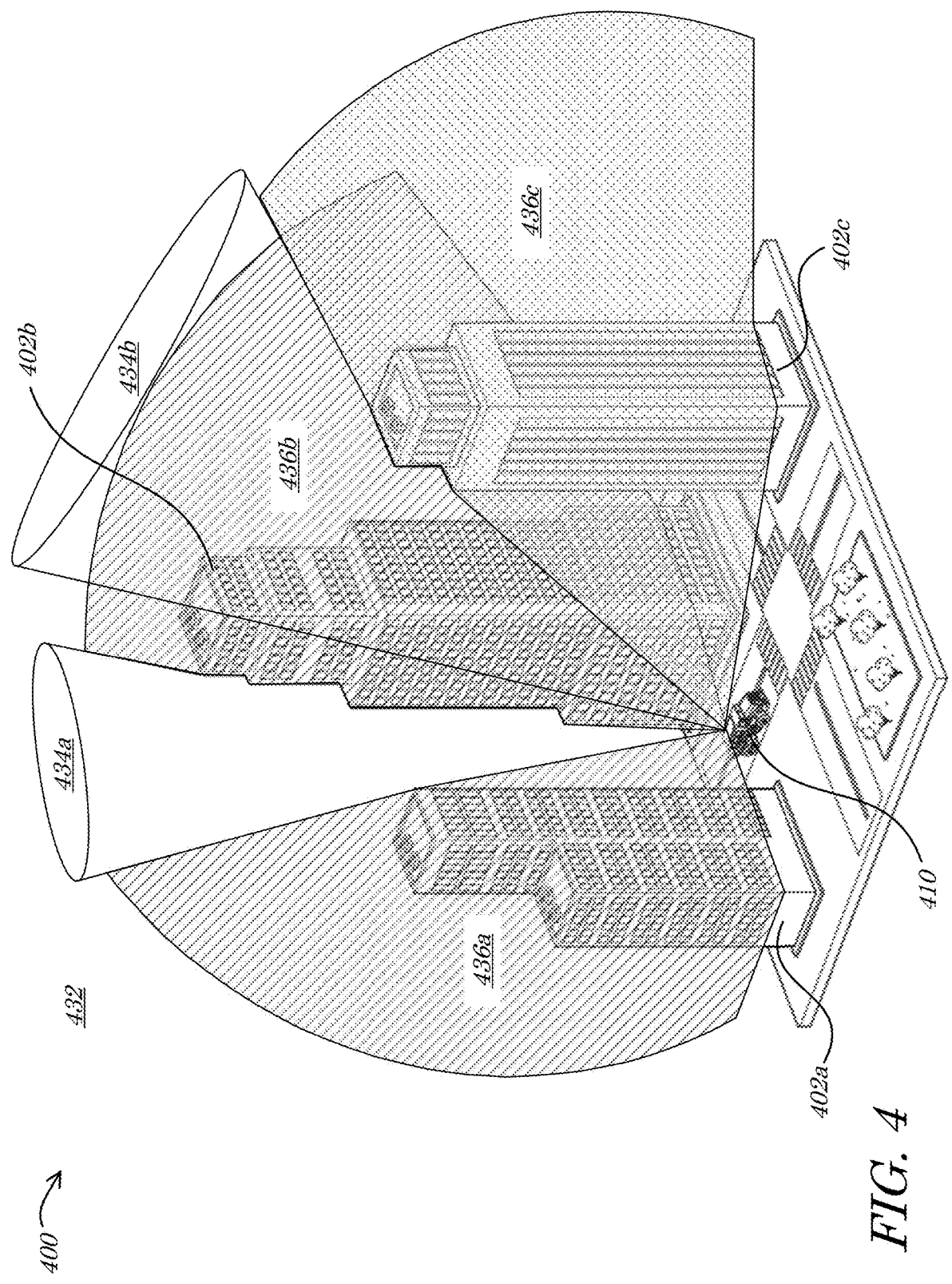
FIG. 4 is a block diagram of a system according to some embodiments.

Turning now to FIG. 4, a block diagram of a system 400 according to some embodiments is shown. The system 400 may comprise, for example, an environment in which a plurality of objects 402a-c are disposed around a vehicle 410. In the case that the vehicle 410 comprises GNSS/GPS equipment (and/or other navigation signal receiving equipment; not separately shown) to permit the vehicle 410 to compute the geo-location of the vehicle 410, typical systems would utilize GNSS/GPS signals (not separately shown in FIG. 4) received from any portion of the sky 432 (e.g., from a plurality of satellites; not shown) to resolve the geo-location (e.g., GPS and/or latitude and longitude coordinates of the vehicle 410). According to some embodiments, the system 400 may instead selectively and/or opportunistically resolve the geo-location of the vehicle 410 by identification of a plurality of "open sky" regions 434a-b and/or by identification of a plurality of "obstructed sky" regions 436a-c.

The identified regions 434a-b, 436a-c may, for example, be utilized to selectively choose which received signals the vehicle 410 will utilize (and/or weigh more heavily) in resolving the geo-location calculations. In some embodiments, any or all signals received from bearings, directions, and/or locations (e.g., derived, calculated, and/or estimated) that correspond to one or more of the obstructed sky regions 436a-c may be discarded and/or down-weighted when performing the geo-location calculations. It may be presumed, for example, that any signal originating from and/or arriving from a first obstructed sky region 436a must be either a refracted, reflected, and/or a counterfeit signal, as the sky 432 corresponding to the first obstructed sky region 436a is not visible (e.g., there is no direct line-of-sight) to the vehicle 410.

According to some embodiments, the regions 434a-b, 436a-c may be identified based on a known or estimated location of the vehicle 410 and data descriptive of the objects 402a-c. In some embodiments, known satellite locations may be utilized to identify and/or define the open sky regions 434a-b. Incoming signal bearings may be compared to known satellite location bearings, for example, to identify signals that correspond to satellite location bearings and are accordingly determined to be within an open sky region 434a-b, as opposed to incoming signal bearings that do not correspond to known satellite location bearings and are accordingly determined to be within an obstructed sky region 436a-c (and/or to otherwise not comprise a line-of-sight signal). In some embodiments, the vehicle 410 may sense, identify, locate, and/or characterize the objects 402a-c and define the regions 434a-b, 436a-c based on the data descriptive of the objects 402a-c. The vehicle 410 may "sense" the open sky regions 434a-b, for example, by identifying areas in which no LiDAR and/or radar returns have been received (i.e., in which none of the objects 402a-c have been detected). According to some embodiments, as the vehicle 410 moves, the regions 434a-b, 436a-c may be re-identified, re-calculated, and/or otherwise adjusted to account for the new relative orientations of the vehicle 410 and the objects 402a-c (and/or any new/updated locations of any satellites in the visible sky 432). In some embodiments, the previously-calculated geo-location (e.g., utilizing selective/opportunistic signal masking/filtering) may be utilized in conjunction with sensed and/or tracked movement data of the vehicle 410 to estimate the new location and/or time of the vehicle 410.

Fewer or more components 402a-c, 410, 432, 434a-b, 436a-c and/or various configurations of the depicted components 402a-c, 410, 432, 434a-b, 436a-c may be included in the system 400 without deviating from the scope of embodiments described herein. In some embodiments, the components 402a-c, 410, 432, 434a-b, 436a-c may be similar in configuration and/or functionality to similarly named and/or numbered components as described herein. In some embodiments, the system 400 (and/or portion thereof) may comprise a GNSS platform programmed and/or otherwise configured to execute, conduct, and/or facilitate one or more methods (e.g., the method 700 of FIG. 7 herein) for selective and/or opportunistic GNSS/GPS navigation, as described herein.

Figure 5:
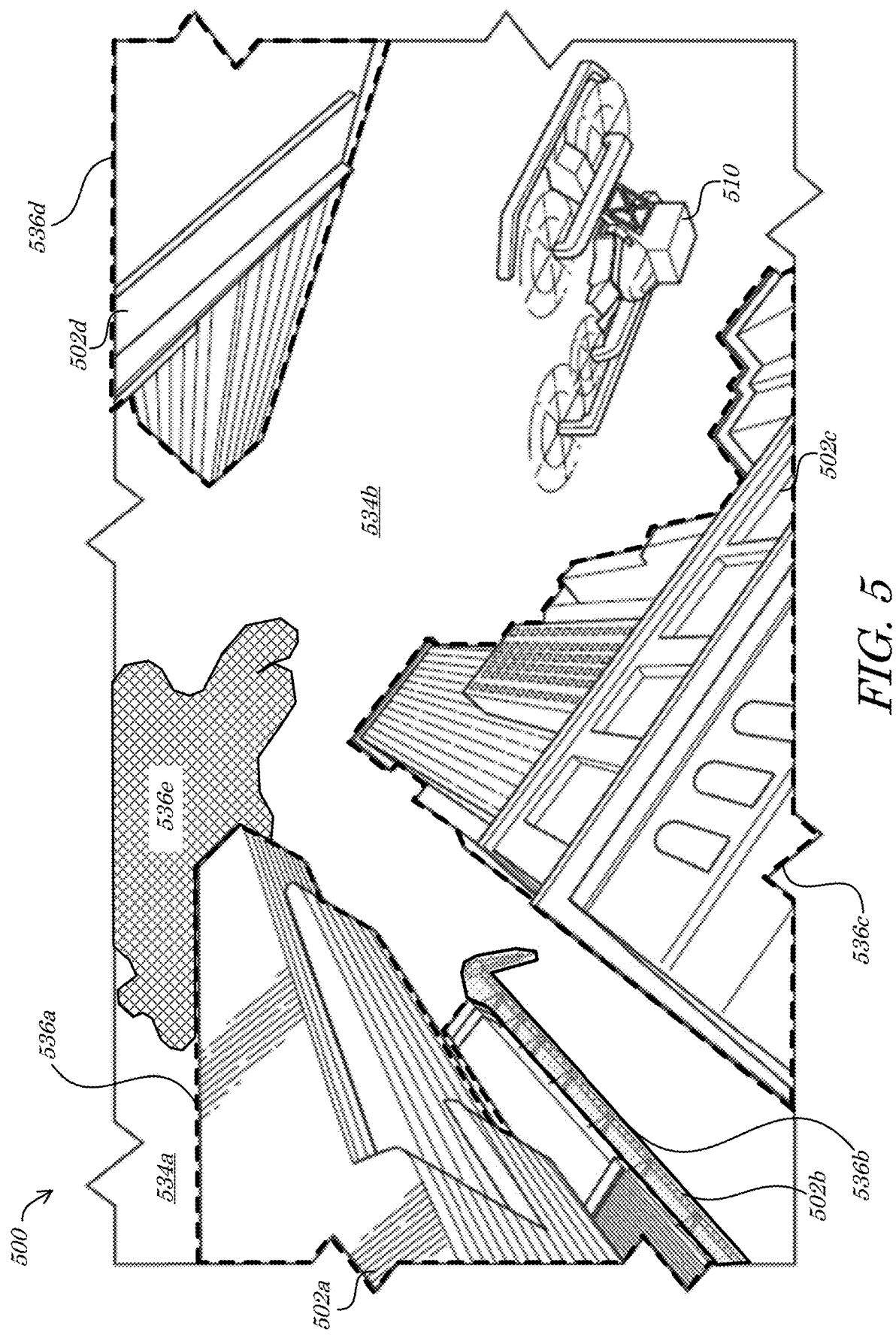
FIG. 5 is a block diagram of a system according to some embodiments.

Referring now to FIG. 5, a block diagram of a system 500 according to some embodiments is shown. The system 500 may comprise, for example, an environment in which a plurality of buildings 502a-d are disposed around a drone 510 (e.g., the drone 510 is flying through/in a city environment). In some embodiments, the drone 510 may comprise GNSS/GPS equipment (not separately shown) to permit the drone 510 to compute the geo-location (e.g., GPS and/or latitude and longitude coordinates and/or elevation) of the drone 510 (e.g., for navigational purposes), According to some embodiments, the drone 510 may selectively and/or opportunistically resolve the geo-location data (e.g., repetitively, as it changes location in the environment) by identification of a plurality of "open sky" regions 534a-b and/or by identification of a plurality of "obstructed sky" regions 536a-d.

The identified regions 534a-c, 536a-e may, for example, be utilized to selectively choose which received signals (e.g., GNSS/GPS signals; not shown) the drone 510 will utilize (and/or weigh more heavily) in resolving the geo-location calculations. In some embodiments, any or all signals received from bearings, directions, and/or locations (e.g., derived, calculated, and/or estimated) that correspond to one or more of the obstructed sky regions 536a-e may be discarded and/or down-weighted when performing the geo-location calculations. First, third, and fourth obstructed sky regions 536a, 536c, 536d may directly correspond to areas of the sky blocked by the buildings 502a-c, for example, and any signals received from those obstructed sky regions 536a, 536c, 536d (e.g., a first subset) may be filtered out and/or ignored. In some embodiments, one or more of the obstructed sky regions 536a-e may be assigned to and/or associated with (e.g., based on stored association data) a weight, "handicap", and/or other qualitative and/or quantitative modifier. According to some embodiments, for example, second and/or fifth obstructed sky regions 536b, 536e may comprise areas that corresponds to partial obstructions or potential interferences such as the depicted crane structure interference area 536b and cloud/smoke area 536e in FIG. 5. In some embodiments, signals received from the second and/or fifth obstructed sky regions 536b, 536e may be utilized as input in the geo-location calculations but may be modified (and/or calculated in a modified manner), e.g., based on the assigned modifiers. In some embodiments, data descriptive of the potential interferences (e.g., clouds, smoke, area of signal interference, etc.) may be characterized and the modifiers may be selected and/or computed based on one or more characteristics of the potential interferences. In the case that one of the potential interferences (e.g., a first interference) comprises a first/certain type, size, density (e.g., moisture content), temperature, and/or altitude of cloud, for example, the modifier may comprise a first value, while in the case of a second/different type, size, density (e.g., moisture content), temperature, and/or altitude of cloud, the modifier may comprise a second value.

Fewer or more components 502a-c, 510, 534a-b, 536a-e and/or various configurations of the depicted components 502a-c, 510, 534a-b, 536a-e may be included in the system 500 without deviating from the scope of embodiments described herein. In some embodiments, the components 502a-c, 510, 534a-b, 536a-e may be similar in configuration and/or functionality to similarly named and/or numbered components as described herein. In some embodiments, the system 500 (and/or portion thereof) may comprise a GNSS platform programmed and/or otherwise configured to execute, conduct, and/or facilitate one or more methods (e.g., the method 700 of FIG. 7 herein) for selective and/or opportunistic GNSS/GPS navigation, as described herein.

Figure 6A:
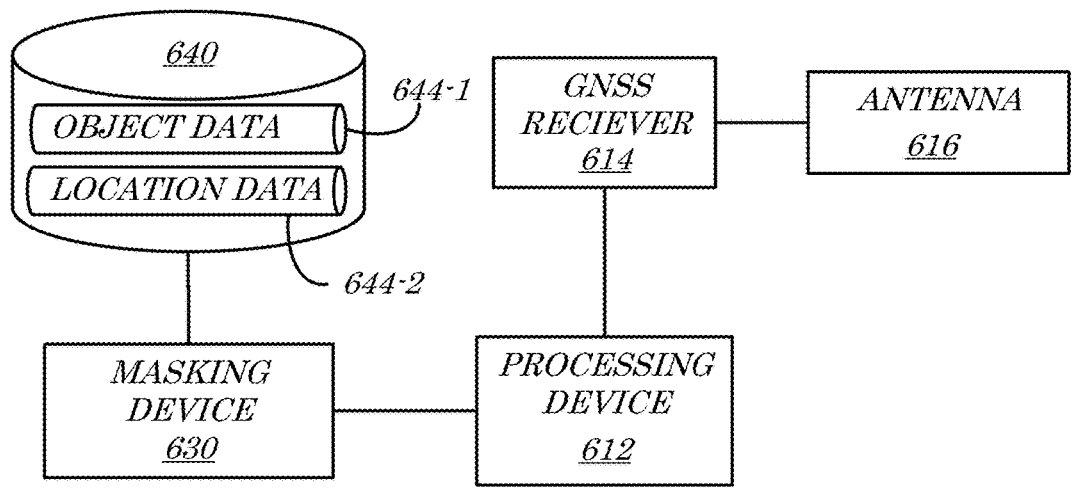
FIG. 6A, FIG. 6B, FIG. 6C, FIG. 6D, FIG. 6E, FIG. 6F, FIG. 6G, and FIG. 6H are block diagrams various example configurations of a system according to some embodiments.
Figure 6B:
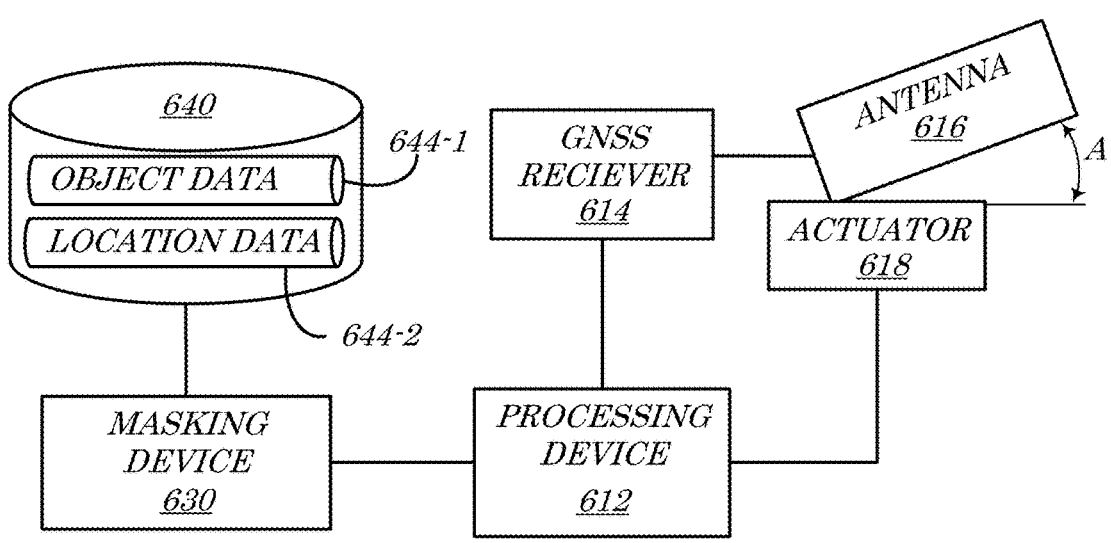
Figure 6C:
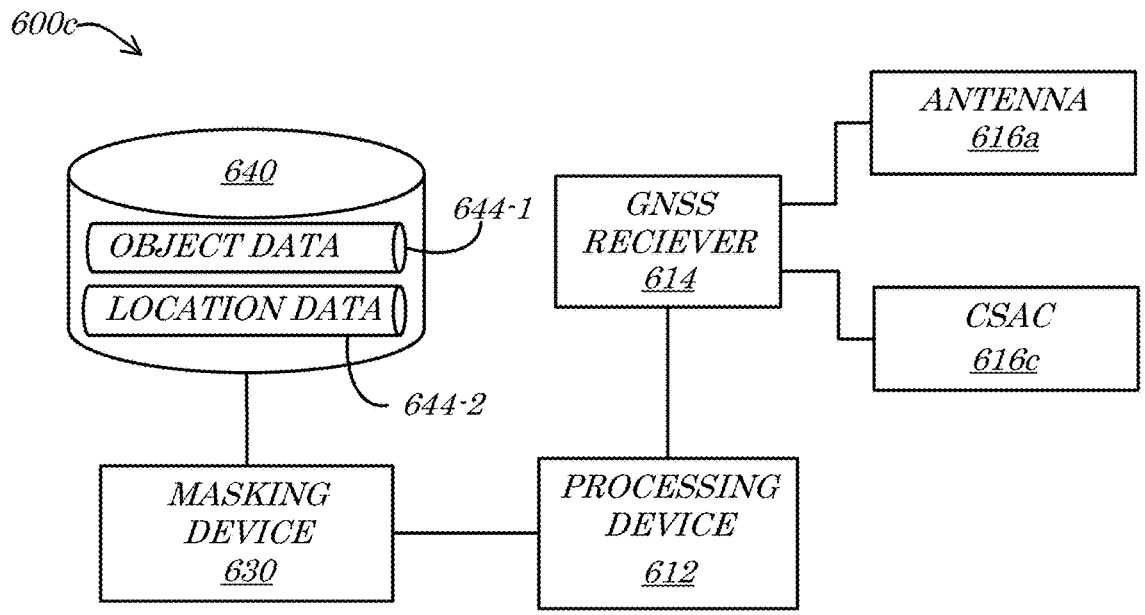
Figure 6D:
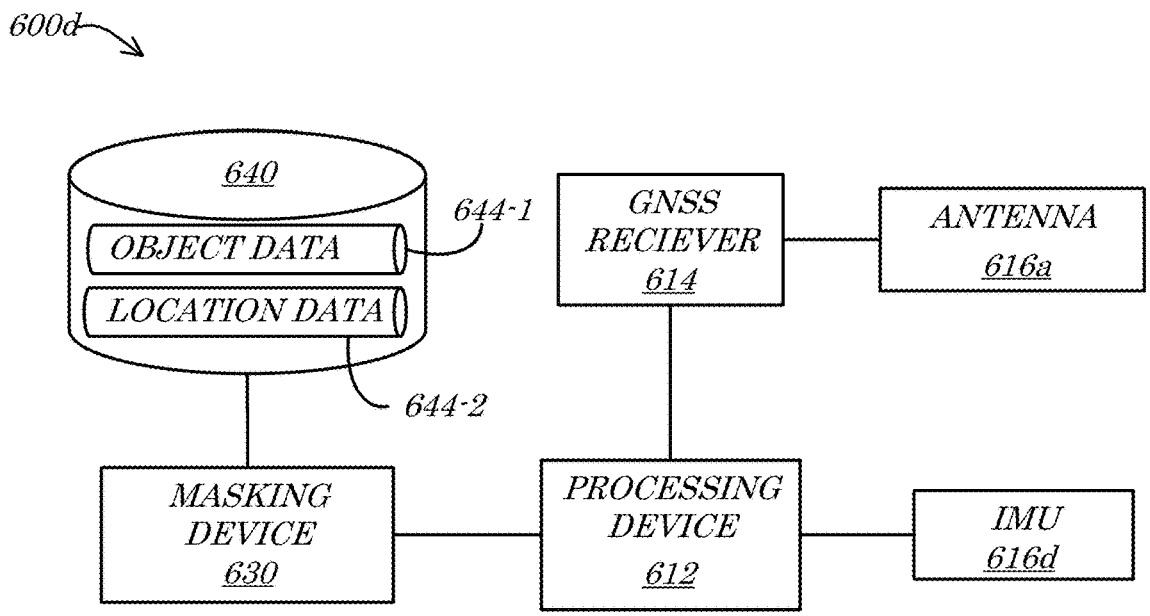
Figure 6E:
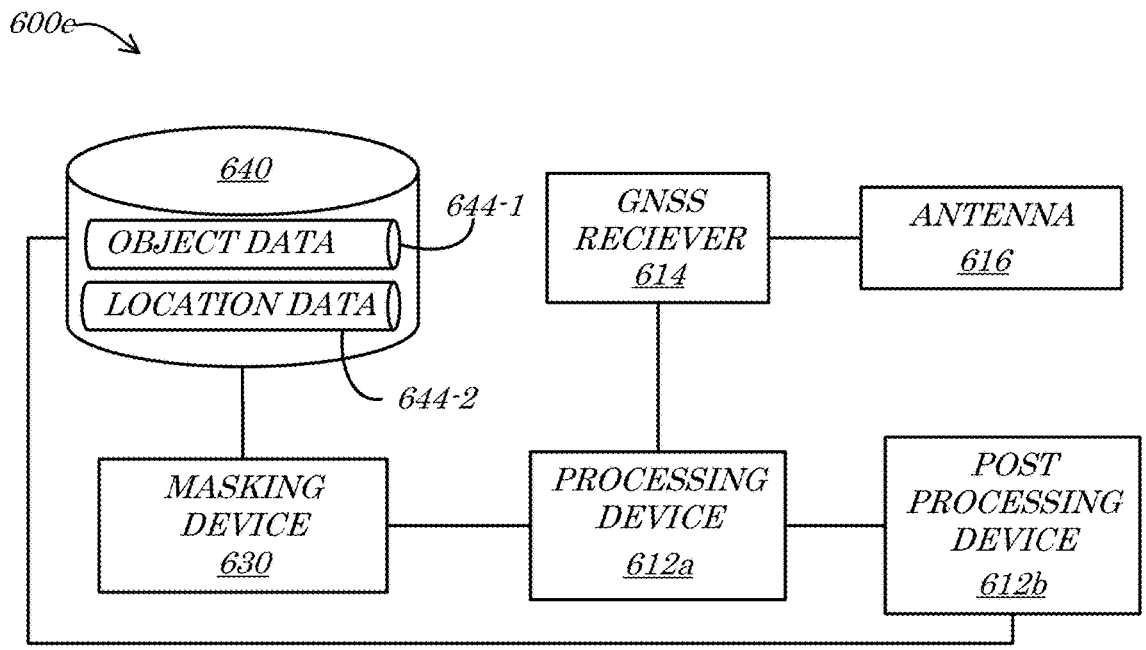

Referring now to FIG. 6A, FIG. 6B, FIG. 6C, FIG. 6D, FIG. 6E, FIG. 6F, FIG. 6G, and FIG. 6H, block diagrams of various example configurations of a system 600a-h according to some embodiments are shown. In some embodiments, the system 600a-h may comprise an object 602 (e.g., an obstruction and/or interference; e.g., shown in FIG. 6G), one or more processing devices 612 (e.g., a processing device 612a and/or a post processing device 612b, as depicted in FIG. 6E), one or more GNSS receivers 614, 614a-b, one or more antenna 616, 616a-b, a Chip Scale Atomic Clock (CSAC) 616c (e.g., shown in FIG. 6C), an IMU 616d (e.g., shown in FIG. 6D), a sensor 616g (e.g., shown in FIG. 6G), one or more actuators 618, 618h-1, 618h-2, a masking device 630, and/or a memory device 640 (e.g., storing object data 644-1 and/or location data 644-2). The memory device 640 may comprise a database containing a description of open areas where the sky can be seen directly without occlusions (e.g., the object data 644-1), for example, and/or the processing device 612 may comprise a controller/computer programmed to process localization solutions for pseudoranges coming from satellites (not shown) that are not occluded by a mask and/or filter applied by the masking device 630. With reference to a first configuration of the system 600a depicted in FIG. 6A, for example, one or more signals from one or more satellites may be received by the antenna 616 and the incoming data/input may be provided to and/or processed by the GNSS receiver 614. In some embodiments, the processing device 612 may execute stored instructions in coordination with data from the GNSS receiver 614 to permit the masking device 630 to alter, adjust, and/or influence geo-location computations. The masking device 630 may apply terrain, obstruction, and/or other object data 644-1 and utilize a current and/or estimated location from the location data 644-2, for example, to selectively exclude certain signals from the computational input, e.g., by masking, filtering, limiting, adjusting, and/or otherwise modifying a full set of signals to a reduced subset of utilized signals thereof.

According to some embodiments, a second configuration of the system 600b as shown in FIG. 6B may comprise a directional antenna 616 that is selectively pointed to areas where the sky is clear of obstructions and to known satellites locations. The masking device 630 may query the memory device 640 and retrieve satellite location/bearing data, for example, and in coordination with the processing device 612 may command the actuator 618 to selectively position the directional antenna 616 at an angle "A" (e.g., with respect to the horizon as shown and/or with respect to one or more other planes of reference). In the case that the directional antenna 616 defines a particular range, aperture, and/or sensing area with respect to a direction in which the directional antenna 616 is selectively oriented by the second configuration of the system 600b, the direction may be selected to ensure that the range, aperture, and/or sensing area stays oriented with one or more "open sky" areas, e.g., to prevent reception of reflected, refracted, bent, and/or otherwise degraded and/or suspect signals.

In some embodiments, a third configuration of the system 600c as shown in FIG. 6C may comprise the CSAC 616c, which may comprise, for example, an accurate clock that can process the GNSS solution over time by sequentially receiving different satellite signals via the antenna 616a. According to some embodiments, a fourth configuration of the system 600d depicted in FIG. 6D may comprise the IMU 616d that may, for example, provide inertial/visual odometry/LiDAR odometry and/or other relative localization data to measure a change in pose within subsequent GNSS measurements. In some embodiments, a fifth configuration of the system 600e as depicted in FIG. 6E may comprise the post processing device 612b that may operate upon computed data from the processing device 612a to populate the object data 644-1 and/or the location data 644-2. The post processing device 612b may, for example, populate a database (e.g., the memory device 640) that is built by postprocessing GPS solutions and marking pseudoranges that distorted the solutions (that are analyzed to be likely to be multipath). In such a manner, for example, suspect signals bearings, origination locations, and/or regions or areas may be flagged and utilized by the masking device 630 to filter signals for future GNSS computations.

Figure 6F:
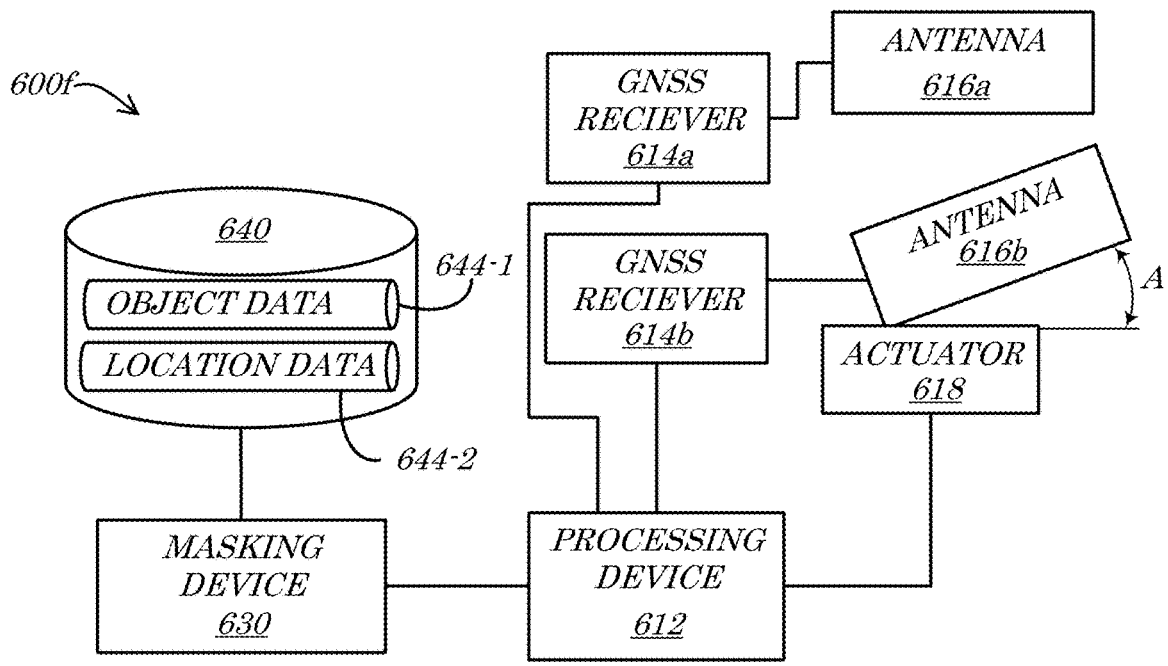
Figure 6G:
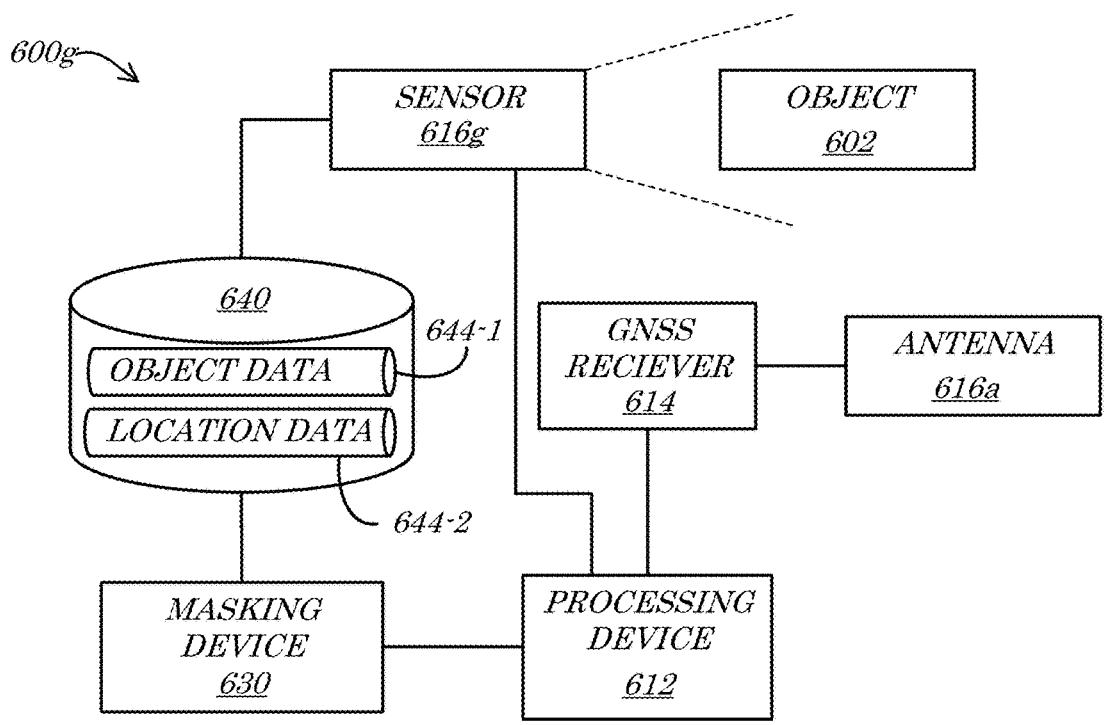
Figure 6H:
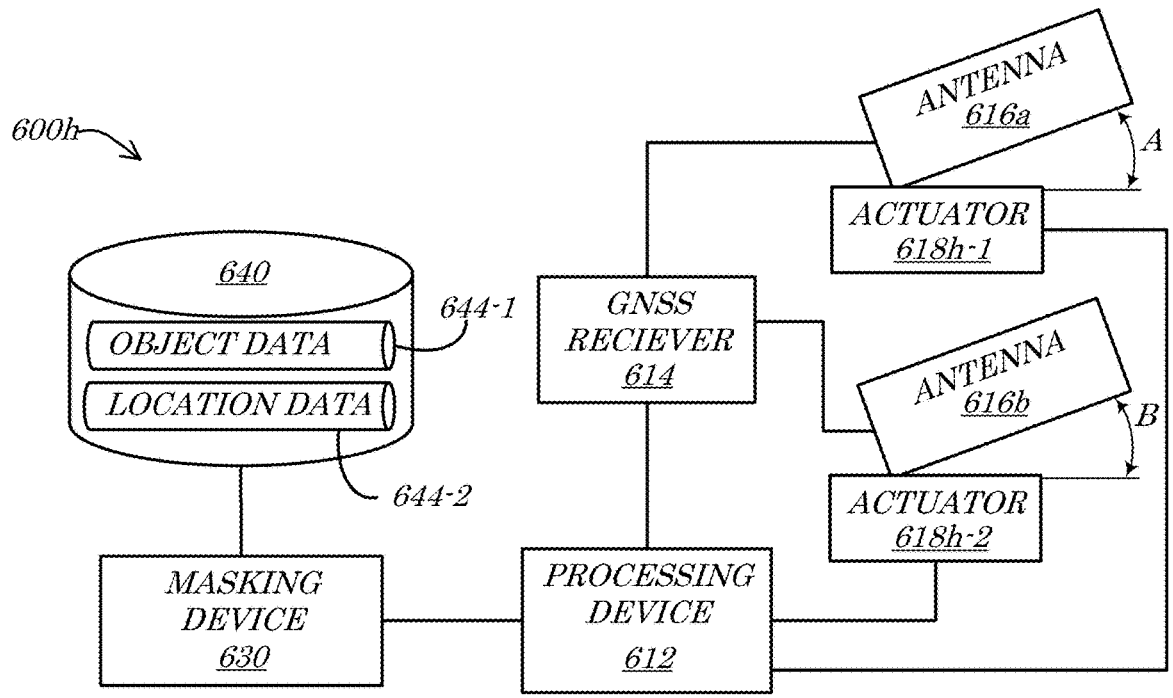

According to some embodiments, a sixth configuration of the system 600f as shown in FIG. 6F may comprise a first/omnidirectional antenna 616a and a directional antenna 616b. In some embodiments, each antenna 616a-b may be in communication with a separate GNSS receiver 614a-b. In the sixth configuration of the system 600f, signals received via the different antennas 616a-b may be processed and compared to identify signals that are suspect. The sixth configuration of the system 600f may be configured, for example, such that a direction at which the directional antenna 616b is pointing is utilized as a filter for detecting multipath either in real time or for building the database of masks (i.e., the object data 644-1). According to some embodiments, a seventh configuration of the system 600g as shown in FIG. 6G may comprise a sensor 616g that builds and/or populates the object data 644-1 (and/or the location data 644-2) by detecting, identifying, locating, and/or classifying the object 602. In such a manner, for example, the seventh configuration of the system 600g may self-build and/or derive a model and/or mapping of clear and obstructed sky areas, bearings, locations, etc., without the need to utilize data from a separate and/or remote source. According to some embodiments, the sensor 616g may sense and/or detect various environmental and/or object data such as data descriptive of a size, shape, location, density, and/or temperature of the object 602, and/or wind, rain, light, humidity, magnetic field, and/or pressure measurements. Wind measurements from the sensor 616g may, for example, be utilized to predict and/or track smoke and/or other transient and/or mobile interferences to dynamically adjust masking/filtering applied by the masking device 630. In some embodiments, an eighth configuration of the system 600h as depicted in FIG. 6H may comprise two or more directional antennas 616a-b (e.g., and associated and/or coupled actuators 618*h*-1, 618*h*-2) utilized to receive signals from different satellites (e.g., in different clear sky areas) at a single time.

Fewer or more components 602, 612, 612*a*, 612*b*, 614, 614*a-b*, 616, 616*a-b*, 616*c*, 616*d*, 616*g*, 618, 618*h*-1, 618*h*-2, 630, 640, 644-1, 644-2 and/or various configurations of the depicted components 602, 612, 612*a*, 612*b*, 614, 614*a-b*, 616, 616*a-b*, 616*c*, 616*d*, 616*g*, 618, 618*h*-1, 618*h*-2, 630, 640, 644-1, 644-2 may be included in the system 600 without deviating from the scope of embodiments described herein. In some embodiments, the components 602, 612, 612*a*, 612*b*, 614, 614*a-b*, 616, 616*a-b*, 616*c*, 616*d*, 616*g*, 618, 618*h*-1, 618*h*-2, 630, 640, 644-1, 644-2 may be similar in configuration and/or functionality to similarly named and/or numbered components as described herein. In some embodiments, the system 600 (and/or portion thereof) may comprise a GNSS platform programmed and/or otherwise configured to execute, conduct, and/or facilitate one or more methods (e.g., the method 700 of FIG. 7 herein) for selective and/or opportunistic GNSS/GPS navigation, as described herein.

III. Selective and/or Opportunistic GNSS/GPS Navigation Methods

Figure 7:
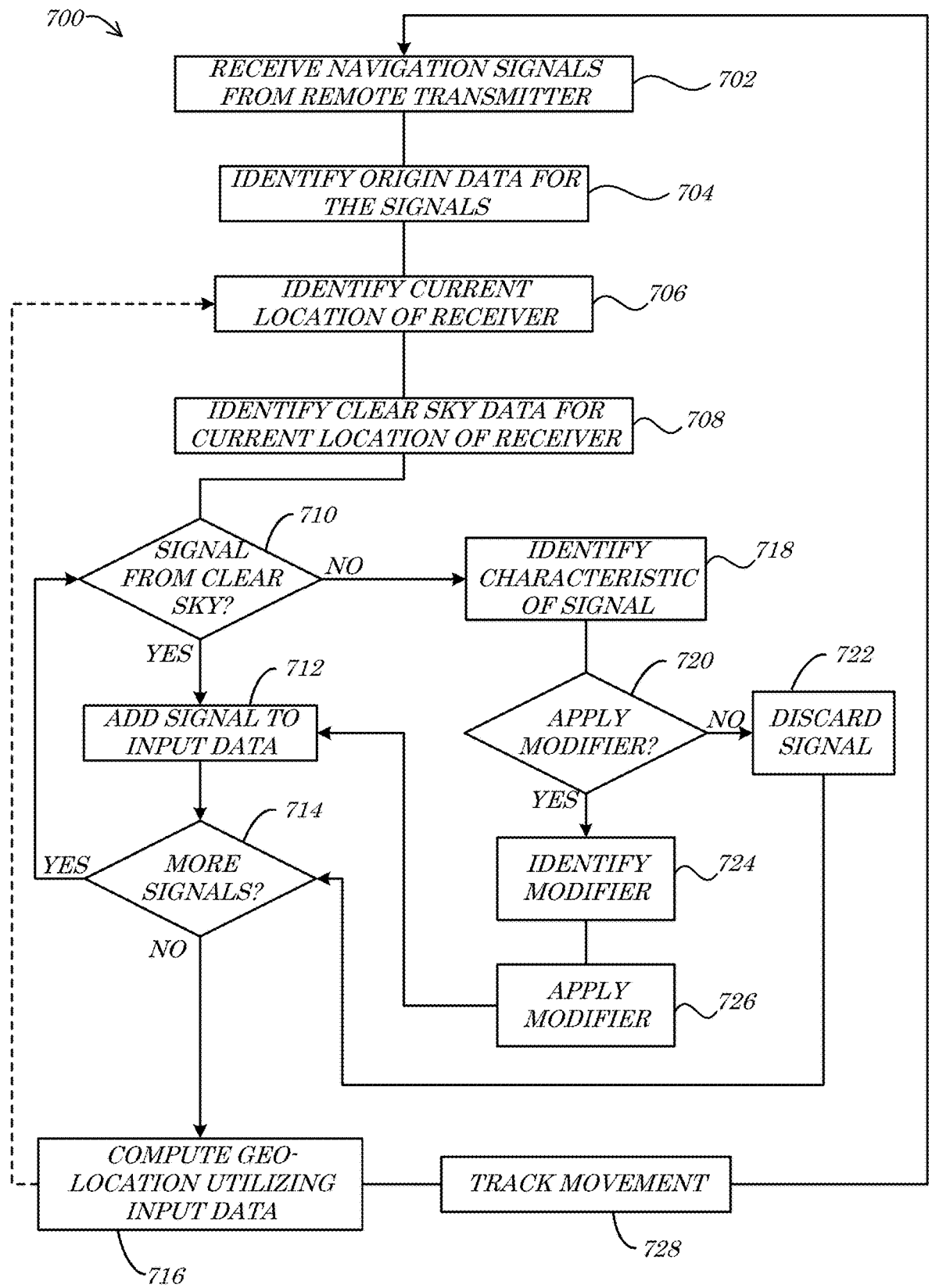
FIG. 7 is a flow diagram of a method according to some embodiments.
Figure 8:
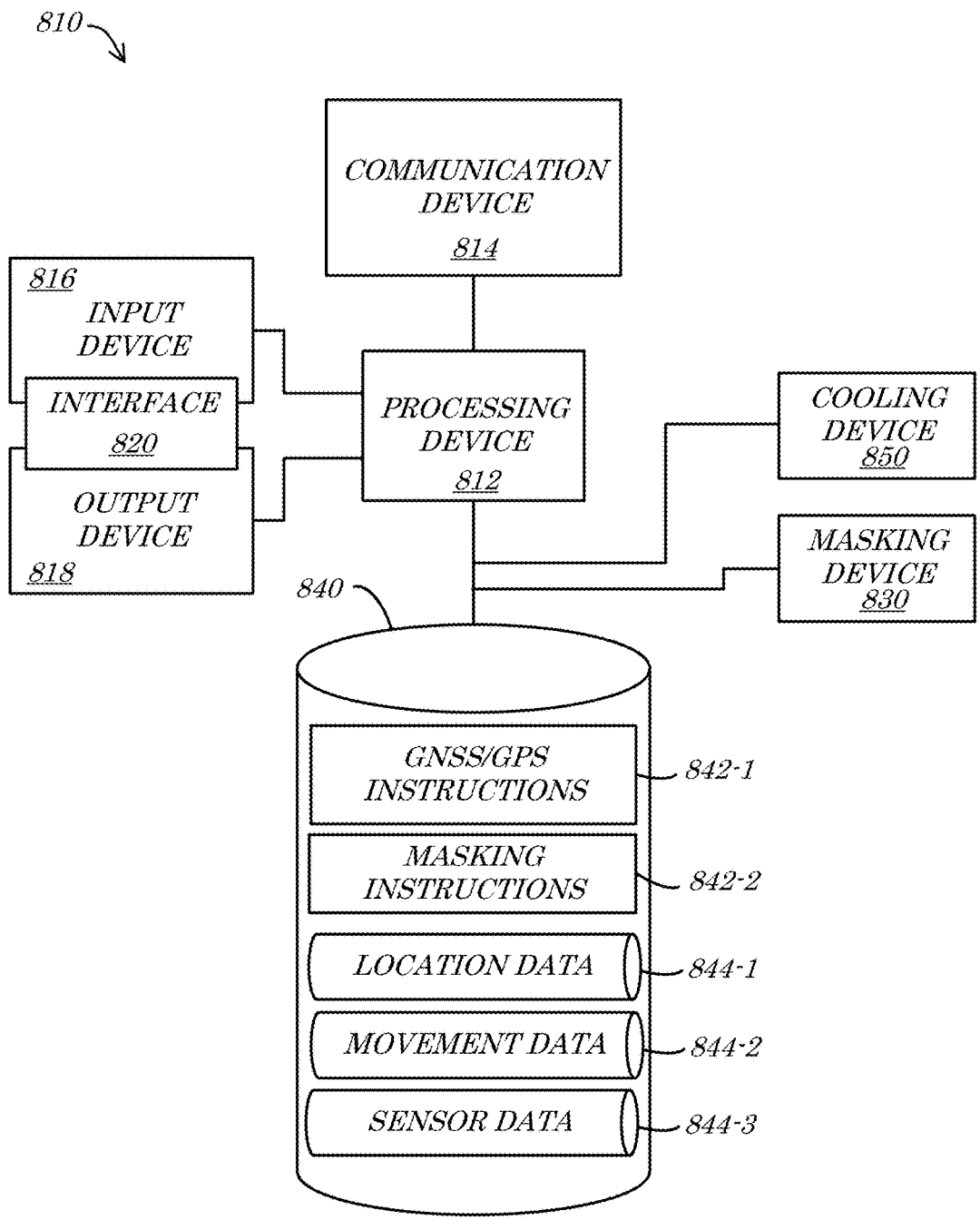
FIG. 8 is a block diagram of an apparatus according to some embodiments.
Figure 9A:
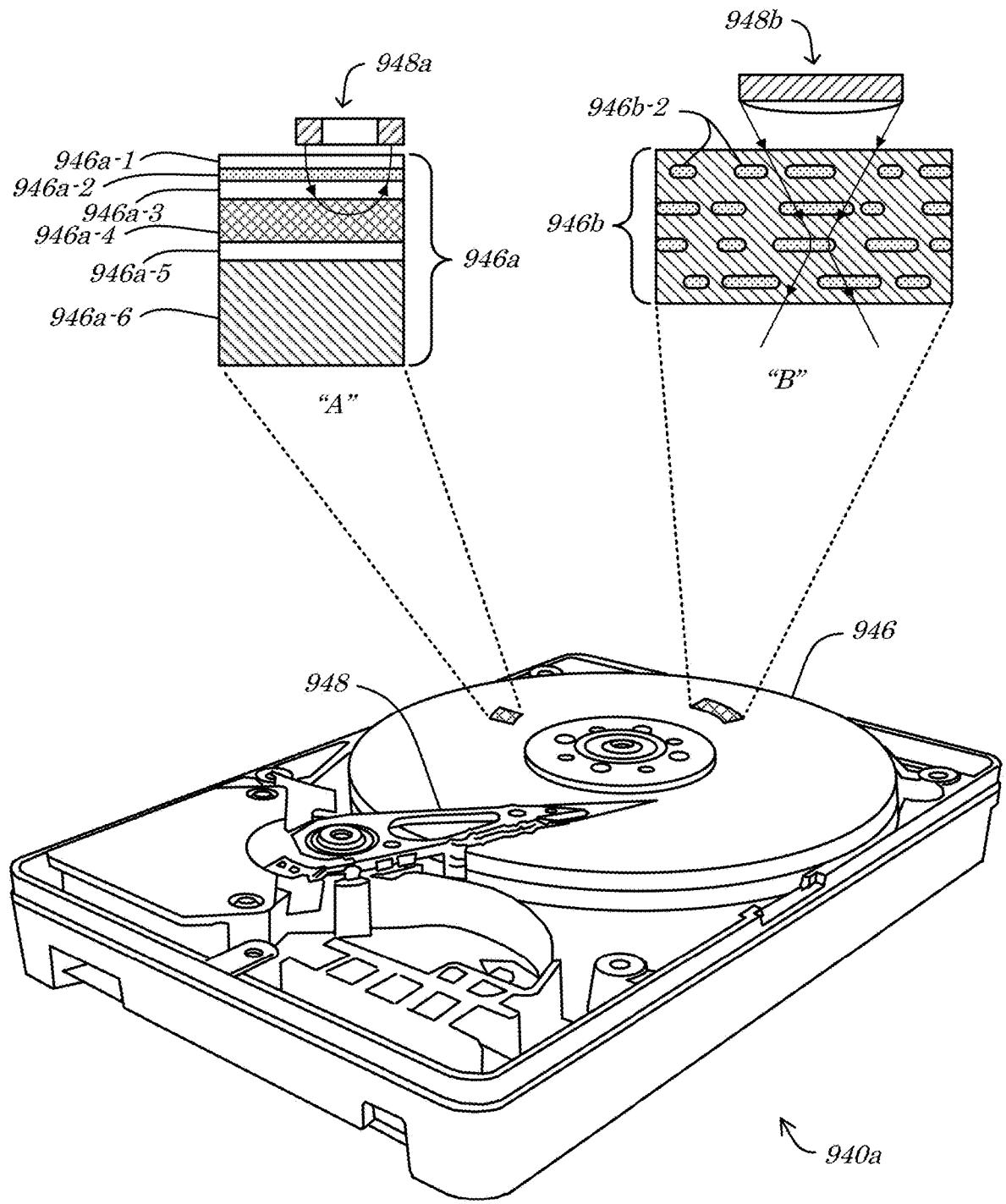
FIG. 9A, FIG. 9B, FIG. 9C, FIG. 9D, and FIG. 9E are perspective diagrams of exemplary data storage devices according to some embodiments.
Figure 9B:
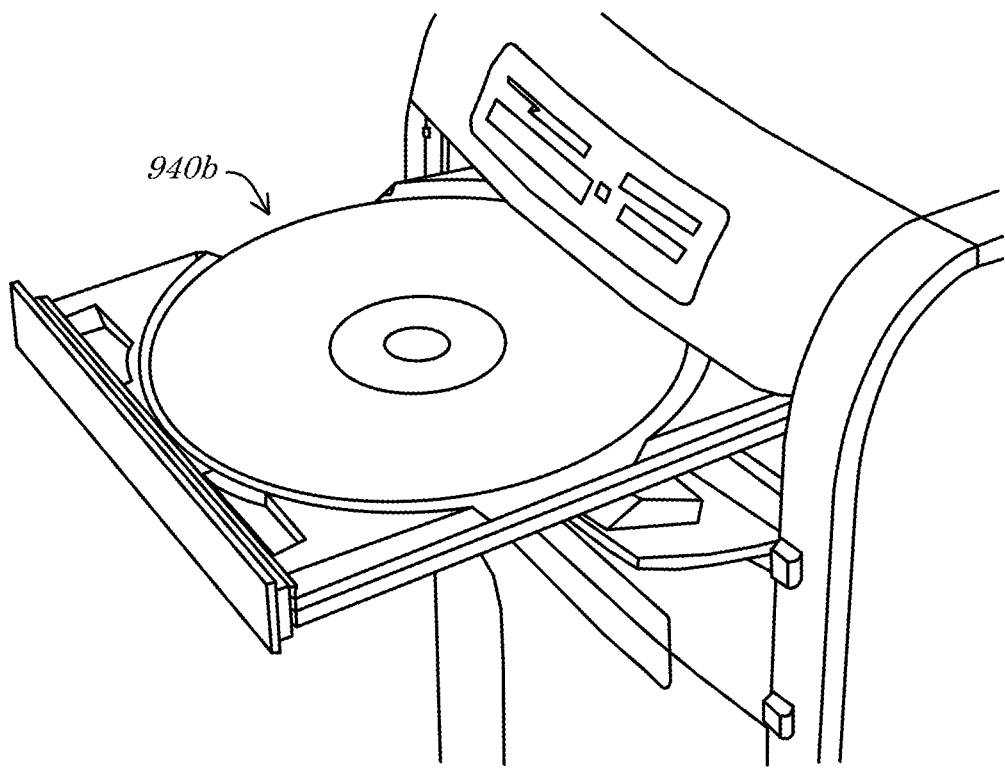
Figure 9C:
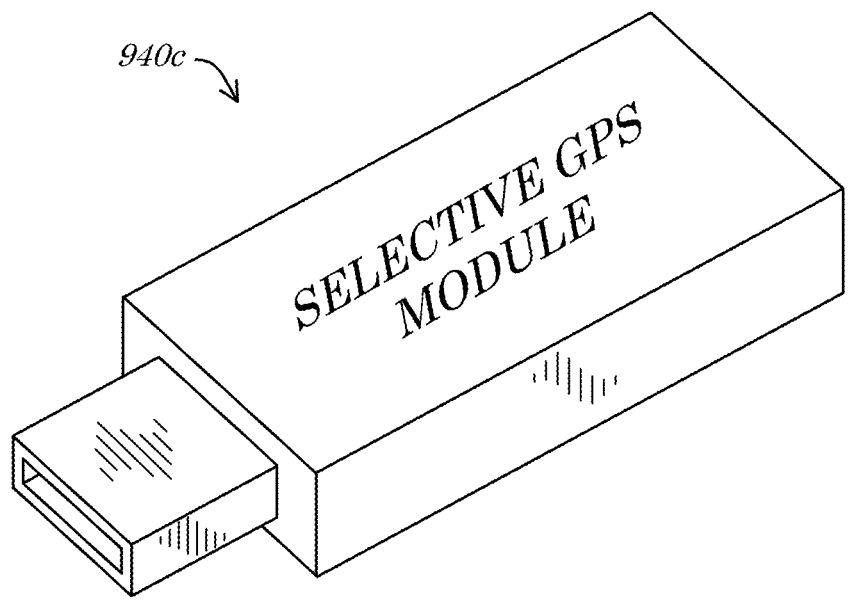
Figure 9D:
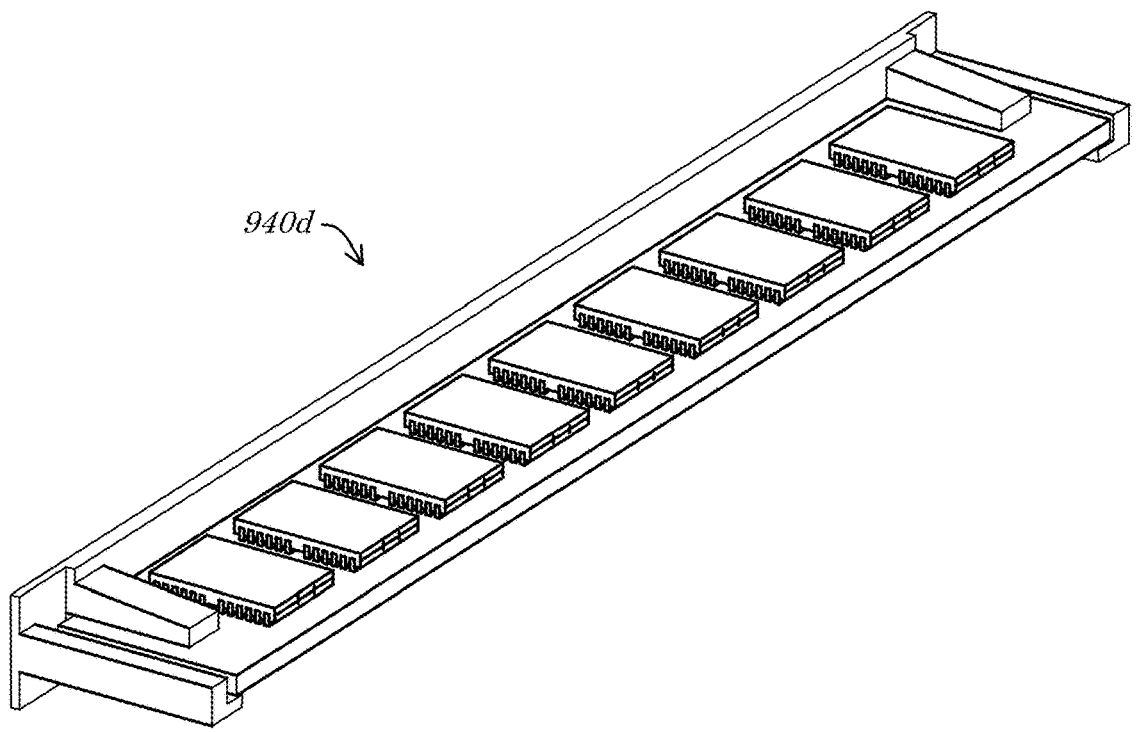
Figure 9E:
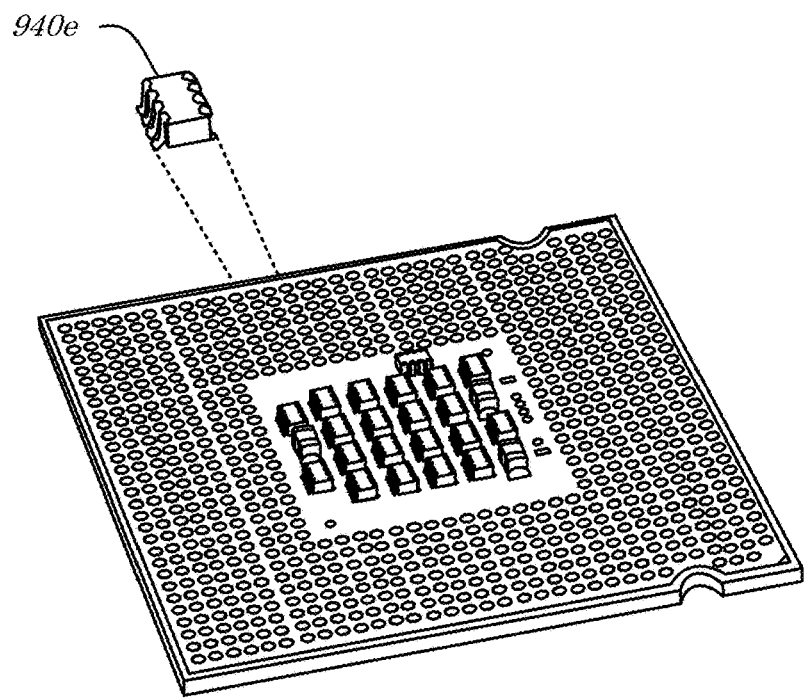

Referring now to FIG. 7, a flow diagram of a method 700 according to some embodiments are shown. In some embodiments, the method 700 may be performed and/or implemented by and/or otherwise associated with one or more specialized and/or specially-programmed computers (e.g., one or more of the vehicles/receivers 210, 310, 410, 510, processing devices 212, 612, 612*a*, 612*b*, 812, the remote server 206, and/or the apparatus 810 of FIG. 2, FIG. 3, FIG. 4, FIG. 5, FIG. 6A, FIG. 6B, FIG. 6C, FIG. 6D, FIG. 6E, FIG. 6F, FIG. 6G, FIG. 6H, and/or FIG. 8 herein), computer terminals, computer servers, computer systems and/or networks, and/or any combinations thereof (e.g., by one or more multi-threaded and/or multi-core processing units of a selective GNSS/GPS navigation system). In some embodiments, the method 700 may be embodied in, facilitated by, and/or otherwise associated with various input mechanisms and/or interfaces (such as the interface 820 of FIG. 8 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 240, 640, 840, 940*a-e*, 1040 of FIG. 2, FIG. 6A, FIG. 6B, FIG. 6C, FIG. 6D, FIG. 6E, FIG. 6F, FIG. 6G, FIG. 6H, FIG. 8, FIG. 9A, FIG. 9B, FIG. 9C, FIG. 9D, FIG. 9E, and/or FIG. 10 herein) may store thereon instructions that when executed by a machine (such as a computerized processor) result in performance according to any one or more of the embodiments described herein.

In some embodiments, the method 700 may comprise receiving (e.g., from one or more remote transmitters and/or via at least one antenna) a plurality of signals, at 702. The signals may be transmitted by the one or more remote transmitters and received by a vehicle and/or navigation signal receiver such as a GNSS/GPS receiver, e.g., thereof. In some embodiments, as few as one signal may be received, while in many embodiments the number of signals may be greater than or equal to four (4) or six (6). According to some embodiments, the method 700 may comprise identifying (e.g., by a processing device of the vehicle/receiver) origin data for the signals, at 704. One or more data elements and/or characteristics of the received signals may be measured, computed, decoded, and/or otherwise identified and/or determined, for example, such that data descriptive of an origination location, bearing, angle, etc. of each signal may be identified. In some embodiments, signal strength may be measured and/or may be included in and/or comprise the origin data. Reflected, refracted, and/or diluted signals may, for example, comprise lower signal strengths than similar signals (e.g., from the same source) that are not subject to such instances of interference, and a determination that a signal has been interfered with may provide an indication regarding the signal's origin. According to some embodiments, signal information that identifies a source of the signal may be utilized in conjunction with lookup data defining locations for known sources to derive an origination location of the signal. In some embodiments, a bearing or heading of an incoming signal may be measured and/or derived to indicate a direction of a source location.

According to some embodiments, the method 700 may comprise identifying (e.g., by the processing device of the vehicle/receiver) a current location of the receiver, at 706. The current location may be retrieved from a database of location tracking data and/or of previous geo-location calculations, for example, and/or may be derived/computed based on previous location data and movement data (e.g., of the vehicle). In some embodiments, the method 700 may comprise identifying (e.g., by the processing device of the vehicle/receiver) clear sky data for the current location, at 708. The current location may be utilized, for example, to retrieve 3-D mapping, obstacle, sky-masking, and/or terrain data from a database of geo-referenced data. In some embodiments, the clear sky data may be computed and/or derived based on sensor data captured at the current location (and/or that is otherwise descriptive of the current location). In some embodiments, the clear sky data may comprise definitions of one or more areas of visible sky at the current location that are identified as "clear" (i.e., no known obstructions) or "obstructed" (i.e., some quantity and/or type of obstruction is know to, or is computed to be likely to, exist). According to some embodiments, the clear sky data may be based on a current time, day, day of the week, month, year, and/or season. The clear sky data may define for different seasons at a given current location, for example, which areas of the visible sky (i.e., the portion of sky not blocked by the curvature of the earth and that would be visible via direct line-of-sight but-for any obstructions) are not likely to be blocked by seasonal foliage.

In some embodiments, the method 700 may comprise determining (e.g., by the processing device of the vehicle/receiver) whether any given signal is from "clear sky", at 710. The origin data for a signal may be compared to the clear sky data for the current location, for example, to identify whether the signal likely originated from an area of clear sky or is otherwise likely a suspect signal (e.g., a reflected, refracted, diluted, bent, and/or fake signal). In the case that origin data (e.g., origin location, bearing, etc.) falls within a range of locations, bearings, etc. that are identified as "clear sky", then the signal may be designated, flagged, tagged, and/or marked as being a clear sky signal.

According to some embodiments, in the case that the signal is determined to be a clear sky signal, the method 700 may comprise and/or continue to adding the signal to a listing and/or store of input data, at 712. In some embodiments, the method 700 may comprise determining (e.g., by the processing device of the vehicle/receiver) whether more signals remain to be processed, at 714. In the case that one or more received signals have not yet been analyzed with respect to the clear sky data, for example, the method 700 may proceed back to determining whether the signal is from "clear sky", at 710. In the case that all received signals (and/or all signals amounting to a requisite amount of minimum data necessary and/or desired for computational purposes) have all been categorized, the method 700 may comprise and/or continue to computing a geo-location utilizing the input data, at 716. One or more stored GNSS/GPS geo-location computation algorithms, models, and/or formulas embodied in stored computer code may, for example, be executed utilizing a subset of received signals that have been identified as "clear sky"-originating signals to compute a geo-location/updated location (e.g., for the vehicle/receiver). In some embodiments, iteration may be utilized, e.g., to utilize an estimated and/or best-known current location identified at 706, computing the geo-location utilizing a signal mask (e.g., clear sky data) for the best-known current location, and then re-evaluating and/or recomputing the geo-location by proceeding back to 706 (e.g., via the dotted line shown in FIG. 7). In such a manner, for example, even an inaccurate current location may be utilized (e.g., with an inaccurate/incorrect signal mask/filter) to derive a better/more accurate location, which may then be utilized to further increase the accuracy (e.g., by applying more relevant/accurate location-based masks/filters).

In some embodiments, in the case that a given signal is determined at 710 to not be from clear sky (and/or from "obstructed sky"), the method 700 may comprise and/or continue to identifying a characteristic of the signal, at 718. The strength, intensity, embedded data, and/or incoming bearing of a signal may be informative, for example, of the nature/type of the signal. In some embodiments, the bearing, location, etc. descriptive of the origin of the signal may be utilized to derive the characteristic. It may be determined (e.g., computed) based on the geometry of the current location, known obstacles, and the origin data, for example, that a particular signal has passed through an area of interference (e.g., an "obstructed sky" region or zone). According to some embodiments, the method 700 may comprise determining (e.g., by the processing device of the vehicle/receiver) whether to apply a signal modifier, at 720. Certain signal types and/or certain signals having predefined characteristics may, for example, be determined to be useful for geo-location calculations (particularly in situations where few signals are available to choose from) and while known to be suspect (e.g., for not having originated from known clear sky areas), may be utilized with little negative effect if modified prior to use. The characteristic of the signal may be compared, for example, to stored characteristic data that maps signal characteristics to mathematical modifiers, altered formulas, etc. In the case of a signal known to have passed through an area of cloud interference, for example, a weight modifier and/or signal adjustment modifier configured to account for such cloud interference may be identified (e.g., retrieved from a database). Other signals, e.g., of certain types and/or from certain obstructed sky regions may be determined not to be useful (or too detrimental) and the method 700 may comprise and/or proceed to discarding the signal, at 722. The signal may, for example, be deleted, rejected, filtered out, flagged for non-use (or only for emergency use; e.g., in the case that a reduced quantity of available signals requires additional data to resolve a geo-location), and/or ignored.

According to some embodiments, in the case that it is determined that the signal has a corresponding modifier (e.g., based on a matching of the characteristic to stored characteristic data), the method 700 may comprise and/or continue to identifying the modifier, at 724 and/or applying the modifier, at 726. Stored modifier data determined to be related to the signal type/characteristic may be located in a data store, retrieved, and mathematically applied to the signal data, for example, to define a modified signal. The modification may, in some embodiments, alter data within the signal and/or may be appended to the signal data to define a particular weight, confidence level, threshold, handicap, etc. according to some embodiments, once the signal is modified and/or joined with the appropriate modifier, the method 700 may comprise and/or proceed to adding the modified signal to the input data, at 712. In such a manner, for example, raw direct line-of-sight signals and modified/weighted obstructed sky signals may both be utilized in the geo-location computation at 716. In some embodiments, all obstructed sky signals may simply be discarded at 722, e.g., without additional analysis thereof, and the geo-location may be resolved utilizing only clear sky signal data.

In some embodiments, in the case that the vehicle/receiver is mobile, the method 700 may comprise and/or proceed to tracking movement data, at 728. An IMU and/or other sensors may, for example, measure and/or track vehicle movement to derive a new/updated location that may then be utilized to process additional geo-location fixes. Utilizing the movement tracking data, for example, the method 700 may proceed, in some embodiments, back to receiving additional signals (e.g., at the new/updated location and at a subsequent time) at 702 and the method 700 may be repeated, utilizing the new/updated location data at 706 to calculate a new/updated geo-location resolution/fix.

IV. Selective and/or Opportunistic GNSS/GPS Navigation Apparatus and Articles of Manufacture Turning to FIG. 8, a block diagram of an apparatus 810 according to some embodiments is shown. In some embodiments, the apparatus 810 may be similar in configuration and/or functionality to one or more of the one or more of the vehicles/receivers 210, 310, 410, 510, processing devices 212, 612, 612a, 612b, 812, and/or the remote server 206 of FIG. 2, FIG. 3, FIG. 4, FIG. 5, FIG. 6A, FIG. 6B, FIG. 6C, FIG. 6D, FIG. 6E, FIG. 6F, FIG. 6G, and/or FIG. 6H herein. The apparatus 810 may, for example, execute, process, facilitate, and/or otherwise be associated with the method 700 of FIG. 7 herein, and/or portions thereof. In some embodiments, the apparatus 810 may comprise a processing device 812, a communication device 814, an input device 816, an output device 818, an interface 820, a masking device 830, a memory device 840 (storing various programs and/or instructions 842 and data 844), and/or a cooling device 850. According to some embodiments, any or all of the components 812, 814, 816, 818, 820, 830, 840, 842, 844, 850 of the apparatus 810 may be similar in configuration and/or functionality to any similarly named and/or numbered components described herein. Fewer or more components 812, 814, 816, 818, 820, 830, 840, 842, 844, 850 and/or various configurations of the components 812, 814, 816, 818, 820, 830, 840, 842, 844, 850 may be included in the apparatus 810 without deviating from the scope of embodiments described herein.

According to some embodiments, the processor 812 may be or include any type, quantity, and/or configuration of processor that is or becomes known. The processor 812 may comprise, for example, an Intel® IXP 2800 network processor or an Intel® XEON™ Processor coupled with an Intel® E8501 chipset. In some embodiments, the processor 812 may comprise multiple interconnected processors, microprocessors, and/or micro-engines. According to some embodiments, the processor 812 (and/or the apparatus 810 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 810 comprises a server, such as a blade server, necessary power may be supplied via a standard AC outlet, power strip, surge protector, and/or Uninterruptible Power Supply (UPS) device.

In some embodiments, the communication device 814 may comprise any type or configuration of communication device that is or becomes known or practicable. The communication device 814 may, for example, comprise a Bluetooth® Low Energy (BLE) and/or RF receiver, Network Interface Card (NIC), a telephonic device, a cellular network device, a router, a hub, a modem, and/or a communications port or cable. In some embodiments, the communication device 814 may be coupled to receive GNSS/GPS signal data, e.g., from a satellite and/or other remote transmission source (not shown in FIG. 8). The communication device 814 may, for example, comprise a GNSS/GPS receiver device that receives and/or acquires navigation signal data from a GNSS/GPS satellite constellation (not separately depicted in FIG. 8) and/or a transmitter device that provides navigation data such as computed geo-location fixes. According to some embodiments, the communication device 814 may also or alternatively be coupled to the processor 812. In some embodiments, the communication device 814 may comprise an infrared (IR), RF, Bluetooth™, Near-Field Communication (NFC), and/or Wi-Fi® network device coupled to facilitate communications between the processor 812 and another device (such as a remote user device, not separately shown in FIG. 8).

In some embodiments, the input device 816 and/or the output device 818 are communicatively coupled to the processor 812 (e.g., via wired and/or wireless connections and/or pathways) and they may generally comprise any types or configurations of input and output components and/or devices that are or become known, respectively. The input device 816 may comprise, for example, a keyboard that allows an operator of the apparatus 810 to interface with the apparatus 810 (e.g., by a vehicle operator, navigator, etc.). In some embodiments, the input device 816 may comprise a sensor, such as a camera, sound, light, and/or proximity sensor, configured to capture data of an environment surrounding the apparatus 810 and report measured values (e.g., data decretive of objects/obstacles; not shown) via signals to the apparatus 810 and/or the processor 812. The output device 818 may, according to some embodiments, comprise a propulsion device, display screen, and/or other practicable output component and/or device. The output device 818 may, for example, provide an interface (such as the interface 820) via which functionality for selective/ opportunistic navigation processes is provided to a user (e.g., via a website and/or mobile device application). According to some embodiments, the input device 816 and/or the output device 818 may comprise and/or be embodied in a single device, such as a touch-screen monitor.

The memory device 840 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 840 may, according to some embodiments, store one or more of GNSS/GPS instructions 842-1, masking instructions 842-2, location data 844-1, movement data 844-2, and/or sensor data 844-3. In some embodiments, the GNSS/GPS instructions 842-1, masking instructions 842-2, location data 844-1, movement data 844-2, and/or sensor data 844-3 may be utilized by the processor 812 to provide output information via the output device 818 and/or the communication device 814.

According to some embodiments, the GNSS/GPS instructions 842-1 may be operable to cause the processor 812 to process the location data 844-1, movement data 844-2, and/or sensor data 844-3 in accordance with embodiments as described herein. Location data 844-1, movement data 844-2, and/or sensor data 844-3 received via the input device 816 and/or the communication device 814 may, for example, be analyzed, sorted, filtered, decoded, decompressed, ranked, scored, plotted, and/or otherwise processed by the processor 812 in accordance with the GNSS/GPS instructions 842-1. In some embodiments, location data 844-1, movement data 844-2, and/or sensor data 844-3 may be fed by the processor 812 through one or more mathematical and/or statistical formulas and/or models in accordance with the GNSS/GPS instructions 842-1 to compute, calculate, resolve, derive, and/or otherwise "fix" a geo-location of the apparatus 810, as described herein.

In some embodiments, the masking instructions 842-2 may be operable to cause the processor 812 to process the location data 844-1, movement data 844-2, and/or sensor data 844-3 in accordance with embodiments as described herein. Location data 844-1, movement data 844-2, and/or sensor data 844-3 received via the input device 816 and/or the communication device 814 may, for example, be analyzed, sorted, filtered, decoded, decompressed, ranked, scored, plotted, and/or otherwise processed by the processor 812 in accordance with the masking instructions 842-2. In some embodiments, location data 844-1, movement data 844-2, and/or sensor data 844-3 may be fed by the processor 812 through one or more mathematical and/or statistical formulas and/or models in accordance with the masking instructions 842-2 to identify clear and/or obstructed sky areas/regions and selectively mask, filter, and/or otherwise limit the signal data utilized for geo-location processing, as described herein.

In some embodiments, the apparatus 810 may comprise the masking device 830. The masking device 830 may comprise, for example, a mechanical, electronic, electro-mechanical, firmware, and/or software device that is configured to selectively mask, filter, and/or otherwise limit the signal data utilized for geo-location processing.

According to some embodiments, the apparatus 810 may comprise the cooling device 850. According to some embodiments, the cooling device 850 may be coupled (physically, thermally, and/or electrically) to the processor 812 and/or to the memory device 840. The cooling device 850 may, for example, comprise a fan, heat sink, heat pipe, radiator, cold plate, and/or other cooling component or device or combinations thereof, configured to remove heat from portions or components of the apparatus 810.

Any or all of the exemplary instructions and data types described herein and other practicable types of data may be stored in any number, type, and/or configuration of memory devices that is or becomes known. The memory device 840 may, for example, comprise one or more data tables or files, databases, table spaces, registers, and/or other storage structures. In some embodiments, multiple databases and/or storage structures (and/or multiple memory devices 840) may be utilized to store information associated with the apparatus 810. According to some embodiments, the memory device 840 may be incorporated into and/or otherwise coupled to the apparatus 810 (e.g., as shown) or may simply be accessible to the apparatus 810 (e.g., externally located and/or situated).

Referring to FIG. 9A, FIG. 9B, FIG. 9C, FIG. 9D, and FIG. 9E, perspective diagrams of exemplary data storage devices 940*a-e* according to some embodiments are shown. The data storage devices 940*a-e* may, for example, be utilized to store instructions and/or data, such as the GNSS/GPS instructions 842-1, masking instructions 842-2, location data 844-1, movement data 844-2, and/or sensor data 844-3, each of which is presented in reference to FIG. 8 herein. In some embodiments, instructions stored on the data storage devices 940*a-e* may, when executed by a processor, cause the implementation of and/or facilitate the method 700 of FIG. 7 herein, and/or portions thereof.

According to some embodiments, the first data storage device 940*a* may comprise one or more various types of internal and/or external hard drives. The first data storage device 940*a* may, for example, comprise a data storage medium 946 that is read, interrogated, and/or otherwise communicatively coupled to and/or via a disk reading device 948. In some embodiments, the first data storage device 940*a* and/or the data storage medium 946 may be configured to store information utilizing one or more magnetic, inductive, and/or optical means (e.g., magnetic, inductive, and/or optical-encoding). The data storage medium 946, depicted as a first data storage medium 946*a* for example (e.g., breakout cross-section "A"), may comprise one or more of a polymer layer 946*a*-1, a magnetic data storage layer 946*a*-2, a non-magnetic layer 946*a*-3, a magnetic base layer 946*a*-4, a contact layer 946*a*-5, and/or a substrate layer 946*a*-6. According to some embodiments, a magnetic read head 948*a* may be coupled and/or disposed to read data from the magnetic data storage layer 946*a*-2.

In some embodiments, the data storage medium 946, depicted as a second data storage medium 946*b* for example (e.g., breakout cross-section "B"), may comprise a plurality of data points 946*b*-2 disposed with the second data storage medium 946*b*. The data points 946*b*-2 may, in some embodiments, be read and/or otherwise interfaced with via a laser-enabled read head 948*b* disposed and/or coupled to direct a laser beam through the second data storage medium 946*b*.

In some embodiments, the second data storage device 940*b* may comprise a CD, CD-ROM, DVD, Blu-Ray™ Disc, and/or other type of optically-encoded disk and/or other storage medium that is or becomes known or practicable. In some embodiments, the third data storage device 940*c* may comprise a USB keyfob, dongle, and/or other type of flash memory data storage device that is or becomes know or practicable. In some embodiments, the fourth data storage device 940*d* may comprise RAM of any type, quantity, and/or configuration that is or becomes practicable and/or desirable. In some embodiments, the fourth data storage device 940*d* may comprise an off-chip cache, such as a Level 2 (L2) cache memory device. According to some embodiments, the fifth data storage device 840*e* may comprise an on-chip memory device, such as a Level 1 (L1) cache memory device.

The data storage devices 940*a-e* depicted in FIG. 9A, FIG. 9B, FIG. 9C, FIG. 9D, and FIG. 9E are representative of a class and/or subset of computer-readable media that are defined herein as "computer-readable memory" (e.g., non-transitory memory devices as opposed to transmission devices or media). The data storage devices 840*a-e* may generally store program instructions, algorithms, software engines, code, and/or modules that, when executed by a processing device cause a particular machine to function in accordance with one or more embodiments described herein.

Figure 10:
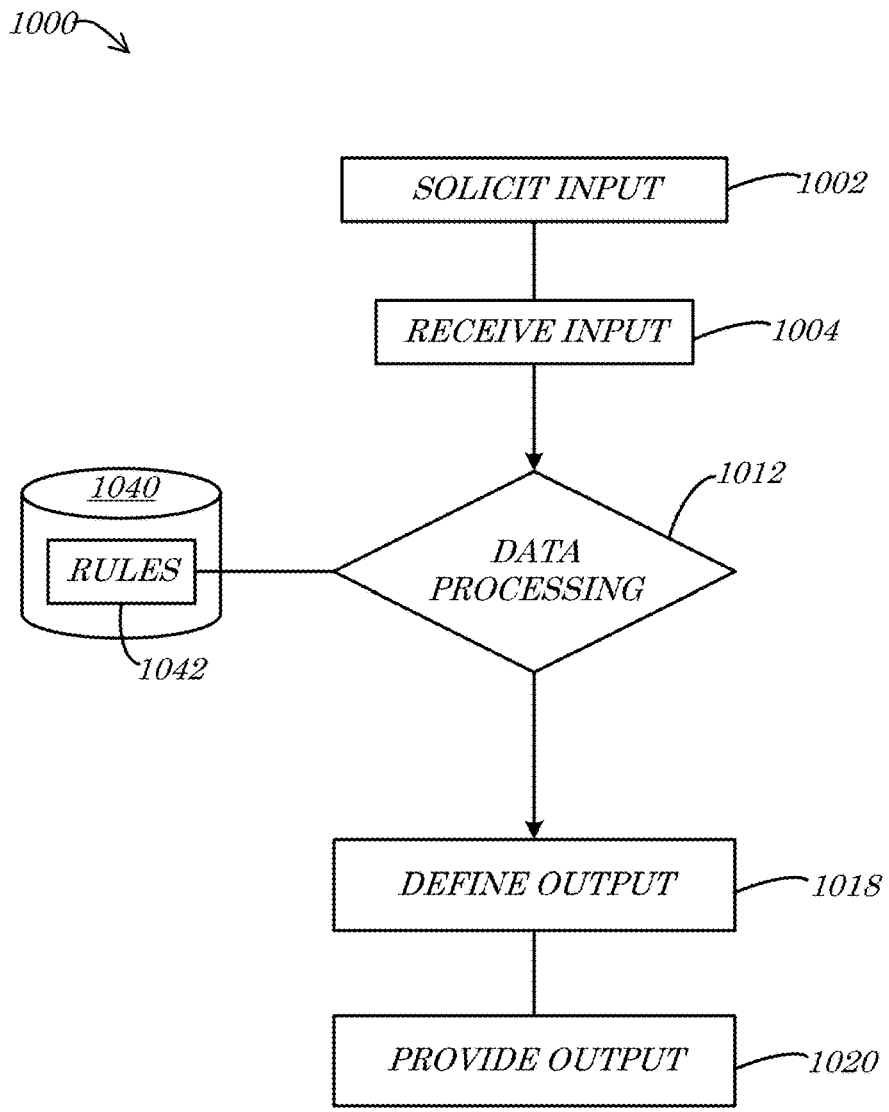
FIG. 10 is flowchart of an algorithm according to some embodiments.

With reference to FIG. 10, for example, the data storage devices 940*a-e* may store and/or define an algorithm 1000. The algorithm 1000 may comprise, for example, one or more software programs, modules, engines, and/or applications coded to perform any of the method 700 of FIG. 7 herein, and/or portions thereof. The algorithm 1000, and any reference to the term "algorithm" herein, refers to any set of defined instructions that operate upon input to define and/or provide output. The algorithm 1000 may, for example, be specifically programmed and/or otherwise defined to instruct a computer or other device (not shown) to solve a particular problem (e.g., logical) and/or resolve a particular mathematical calculation (e.g., arithmetic). In some embodiments, the algorithm 1000 may be written and/or defined as a series or sequence of instructions encoded in (e.g., written in accordance with syntax and/or semantics rules) a particular computer programming language (e.g., Python™, Java™, JavaScript™, C, C++, C#, Basic™, FORTRAN, COBOL, Ruby™, and/or Perl™), e.g., a set of instructions that convert and/or encode characters, objects, and/or other data elements into machine code (e.g., code operable to be executed by an electronic processing device, such as a CPU).

According to some embodiments, the algorithm 1000 may comprise soliciting input, at 1002. Input from one or more sources may be searched for and/or queried, by structuring and/or executing a database query and/or by sending a data communication signal or "handshake", such as is common with Bluetooth® short-range communication protocols. In some embodiments, the algorithm 1000 may comprise receiving the input, at 1004. Whether solicited or otherwise provided and/or acquired (e.g., received as an incoming signal, loaded and/or downloaded), for example, the input for the algorithm 1000 may be received, identified, and/or otherwise processed and/or located. According to some embodiments, the algorithm 1000 may comprise data processing, at 1012. The data processing 1012 may, for example, comprise execution of one or more logical and/or computational procedures, modules, scripts, and/or routines that may be stored in a memory device 1040 (e.g., similar to the data storage devices 940*a-e*) as a set of instructions or rules 1042 and/or that may be defined and/or implemented by one or more electrical, mechanical, and/or physical components, such as logic gates, diodes, transistors, relays, and/or switches (e.g., operable to execute any of the method 700 of FIG. 7 herein, and/or portions thereof).

In some embodiments, execution of the algorithm 1000 may comprise a loading of the rules 1042 into the memory 1040 and/or into an electronic processing system (not shown) and/or an activation of one or more logic gates and/or other electrical and/or mechanical components. The algorithm 1000 may operate upon the input in accordance with the rules 1042 to achieve a result by defining output, at 1018. The algorithm 1000 may, for example, generate, produce, define, identify, calculate, and/or otherwise compute output based on an application of the data processing 1012 utilizing the rules 1042 and any or all input receiving at 1004. According to some embodiments, the algorithm 1000 may comprise providing the output, at 1020. One or more output devices (not shown) may be utilized to convey the output (e.g., a result, conclusion, decision, etc.) to one or more other devices and/or entities (not shown), such as one or more users, consumers, customers, potential customers, and/or devices utilized thereby. The output may be displayed via an electronic display screen of a computer, mobile/smart phone, smart watch, etc., and/or may be transmitted as one or more electronic signals to one or more network destination addresses, such as e-mail addresses, URL locations, MAC addresses, and/or broadcast radio frequencies.

According to some embodiments, the data processing at 1012 may comprise execution of a listing, sequence, matrix, and/or other set of stored steps and/or instructions that utilize the input to define the output. In some embodiments, the listing of steps and/or instruction details may comprise elements that are known to those skilled in the art. The algorithm 1000 may partially or completely comprise, for example, instructions and/or steps that are well known, such as steps and/or instructions operable to calculate an area (length times width), volume (length times width times height), distance (difference between two locations), velocity (distance over time), acceleration (velocity over time), GNSS/GPS location, and/or any other known mathematical and/or logical (if/then statements) procedures. For any and all known procedures and/or instructions, the discrete details of such instructions are represented by the data processing at 1012 and are not listed herein as one of ordinary skill in the art would readily comprehend both what such technological knowledge entails and that the inventor has possession of such knowledge. Instructions that may be included within and/or comprise the data processing at 1012 (and/or the algorithm 1000) may include, for example, but are not limited to, any known or practicable: (i) GNSS, GPS, and/or other navigational geo-location resolution algorithms, (ii) AI and/or ML data input classification algorithms, (iii) data transmission algorithms, (iv) data encoding algorithms, (v) data decoding algorithms, (vi) logical and/or mathematical data comparison algorithms, and (vii) data searching (e.g., keyword searching) algorithms V. Rules of Interpretation Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a FDA" does not imply that any or all of the three items of that list are mutually exclusive and does not imply that any or all of the three items of that list are comprehensive of any category.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As utilized herein, the terms "program" or "computer program" may refer to one or more algorithms formatted for execution by a computer. The term "module" or "software module" refers to any number of algorithms and/or programs that are written to achieve a particular output and/or output goal—e.g., a 'login credentialing' module (or program) may provide functionality for permitting a user to login to a computer software and/or hardware resource and/or a 'shipping' module (or program) may be programmed to electronically initiate a shipment of an object via a known and/or available shipping company and/or service (e.g., FedEX®). The terms "engine" or "software engine" refer to any combination of software modules and/or algorithms that operate upon one or more inputs to define one or more outputs in an ongoing, cyclical, repetitive, and/or loop fashion. Data transformation scripts and/or algorithms that query data from a data source, transform the data, and load the transformed data into a target data repository may be termed 'data transformation engines', for example, as they repetitively operate in an iterative manner upon each row of data to produce the desired results.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. An opportunistic navigation system, comprising:
   an electronic processing device;
   a receiver in communication with the electronic processing device; and
   a non-transitory computer-readable medium storing (i) clear sky data, and (ii) instructions that when executed by the electronic processing device result in:
   receiving, by the receiver a plurality of signals from a plurality of different remote transmitters;

identifying, based on the received signals and for each of the different remote transmitters, at least one of a bearing and an originating transmitter location;

identifying, based on the clear sky data, a first subset of the plurality of signals that comprise at least one of bearings and originating transmitter locations within a predefined open sky range of bearings or originating transmitter locations, respectively;

identifying, based on the clear sky data, a second subset of the plurality of signals that comprise at least one of bearings and originating transmitter locations within a predefined obstructed sky range of bearings or originating transmitter locations, respectively; and computing, based on the first subset of the plurality of signals, a localization solution;

wherein the instructions, when executed by the electronic processing device, further result in:

tracking a movement of a vehicle;

computing a new location of the vehicle; and updating the clear sky data based on the new location of the vehicle;

wherein the clear sky data is identified based on a current location of a vehicle.

2. The opportunistic navigation system of claim 1, wherein the instructions, when executed by the electronic processing device, further result in:

computing a mathematical weighting for at least one signal from the second subset of the plurality of signals; and wherein the computing of the localization solution is further based on the mathematical weighting of the at least one signal from the second subset of the plurality of signals.

3. The opportunistic navigation system of claim 1, wherein the receiver comprises a directional antenna that is selectively oriented to a bearing identified as clear sky by the clear sky data.

4. The opportunistic navigation system of claim 3, further comprising:

an actuator that is operable to receive a command from the processing device and in response to the command, reorient the directional antenna from an initial bearing to the bearing identified as clear sky by the clear sky data.

5. The opportunistic navigation system of claim 1, wherein the instructions, when executed by the electronic processing device, further result in:

receiving, by the receiver an additional plurality of signals from an additional plurality of different remote transmitters;

identifying, based on the received additional signals and for each of the additional different remote transmitters, at least one of a bearing and an originating transmitter location;

identifying, based on the updated clear sky data, a third subset of the additional plurality of signals that comprise at least one of bearings and originating transmitter locations within an updated predefined open sky range of bearings or originating transmitter locations, respectively;

identifying, based on the updated clear sky data, a fourth subset of the additional plurality of signals that comprise at least one of bearings and originating transmitter locations within an updated predefined obstructed sky range of bearings or originating transmitter locations, respectively; and computing, based on the third subset of the plurality of signals, an updated localization solution.

6. The opportunistic navigation system of claim 1, wherein the clear sky data comprises stored data that relates geo-locations to clear sky mask data.

7. The opportunistic navigation system of claim 6, wherein the sky mask data comprises data defining a subset of visible sky areas that are determined to be free of obstacles.

8. The opportunistic navigation system of claim 6, wherein the sky mask data comprises data defining a subset of visible sky areas that are determined to be obstructed by obstacles.

9. The opportunistic navigation system of claim 1, wherein the different remote transmitters comprise a constellation of satellites.

10. An opportunistic navigation system, comprising:

an electronic processing device;

a receiver in communication with the electronic processing device;

a non-transitory computer-readable medium storing (i) clear sky data, and (ii) instructions that when executed by the electronic processing device result in:

receiving, by the receiver a plurality of signals from a plurality of different remote transmitters;

identifying, based on the received signals and for each of the different remote transmitters, at least one of a bearing and an originating transmitter location;

identifying, based on the clear sky data, a first subset of the plurality of signals that comprise at least one of bearings and originating transmitter locations within a predefined open sky range of bearings or originating transmitter locations, respectively;

identifying, based on the clear sky data, a second subset of the plurality of signals that comprise at least one of bearings and originating transmitter locations within a predefined obstructed sky range of bearings or originating transmitter locations, respectively; and computing, based on the first subset of the plurality of signals, a localization solution; and a masking device in communication with the electronic processing device and the receiver.

11. The opportunistic navigation system of claim 10, wherein the identifying of the first and second subsets of signals is performed by the masking device.

12. The opportunistic navigation system of claim 10, wherein the masking device comprises a physical device coupled to the receiver in a manner that selectively blocks the second subset of signals from reaching the receiver.

13. The opportunistic navigation system of claim 10, wherein the instructions, when executed by the electronic processing device, further result in:

computing a mathematical weighting for at least one signal from the second subset of the plurality of signals; and wherein the computing of the localization solution is further based on the mathematical weighting of the at least one signal from the second subset of the plurality of signals.

14. The opportunistic navigation system of claim 10, wherein the receiver comprises a directional antenna that is selectively oriented to a bearing identified as clear sky by the clear sky data.

15. The opportunistic navigation system of claim 14, further comprising:

an actuator that is operable to receive a command from the processing device and in response to the command, reorient the directional antenna from an initial bearing to the bearing identified as clear sky by the clear sky data.

16. The opportunistic navigation system of claim 10, wherein the clear sky data comprises stored data that relates geo-locations to clear sky mask data.

17. The opportunistic navigation system of claim 16, wherein the sky mask data comprises data defining a subset of visible sky areas that are determined to be free of obstacles.

18. The opportunistic navigation system of claim 16, wherein the sky mask data comprises data defining a subset of visible sky areas that are determined to be obstructed by obstacles.

19. The opportunistic navigation system of claim 10, wherein the different remote transmitters comprise a constellation of satellites.

20. The opportunistic navigation system of claim 10, wherein the clear sky data is identified based on a current location of a vehicle.

* * * * *